(12) United States Patent
Meyers et al.

(10) Patent No.: US 8,242,428 B2
(45) Date of Patent: *Aug. 14, 2012

(54) METHOD AND SYSTEM FOR LIDAR USING SPATIAL INFORMATION FROM A LIGHT SOURCE IN COMBINATION WITH NONSPATIAL INFORMATION INFLUENCED BY THE SUBJECT TO DERIVE AN IMAGE

(75) Inventors: Ronald Everett Meyers, Columbia, MD (US); Keith Scott Deacon, Coumbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/819,602

(22) Filed: Jun. 21, 2010

(65) Prior Publication Data

US 2010/0258708 A1    Oct. 14, 2010

Related U.S. Application Data

(63) Continuation-in-part of application No. 12/330,401, filed on Dec. 8, 2008, now Pat. No. 7,812,303.

(60) Provisional application No. 60/992,792, filed on Dec. 6, 2007.

(51) Int. Cl.
*H01L 27/00* (2006.01)
(52) U.S. Cl. .................. 250/208.1; 250/203.6
(58) Field of Classification Search ............... 250/208.1, 250/203.2–203.6, 221; 356/4.01, 141.1, 356/146, 147; 382/106–123, 190–216, 274–278
See application file for complete search history.

(56) References Cited

U.S. PATENT DOCUMENTS

| | | | |
|---|---|---|---|
| 4,929,951 A | 5/1990 | Small |
| 5,430,806 A | 7/1995 | Nettles |
| 5,515,438 A | 5/1996 | Bennett et al. |
| 5,675,648 A | 10/1997 | Townsend |
| 5,953,421 A | 9/1999 | Townsend |
| 5,999,285 A | 12/1999 | Brandt et al. |

(Continued)

OTHER PUBLICATIONS

Cai, Yangjian, et al., "Ghost imaging with incoherent and partially coherent light radiation", Physical Review E 71. 056607 (2005), pp. 1-7.

(Continued)

*Primary Examiner* — Que T Le
(74) *Attorney, Agent, or Firm* — Lawrence E. Anderson

(57) ABSTRACT

A method and system for at least three dimensional imaging comprising a processor for processing information; at least one photon light source generating a beam of light; a modulator for modulating the light of the at least one photon light source; a plurality of first receivers operative to detect the influence of a subject on the beam; the plurality of first receivers being operatively connected to the processor and operating to transmit nonspatial information to the processor; the plurality of first receivers being spaced at known, different distances from the subject, whereby comparison of each of the outputs of the plurality of first receivers provides three dimensional information concerning the subject; the processor operating to correlate the outputs of the plurality of first receivers with spatial information derived from the modulated light at correlating intervals of time to create a three dimensional image of the subject.

20 Claims, 36 Drawing Sheets
(19 of 36 Drawing Sheet(s) Filed in Color)

U.S. PATENT DOCUMENTS

| | | |
|---|---|---|
| 6,272,224 B1 | 8/2001 | Mazourenko |
| 6,289,104 B1 | 9/2001 | Patterson et al. |
| 6,424,665 B1 | 7/2002 | Kwiat et al. |
| 6,444,999 B1 | 9/2002 | Tomita |
| 6,748,083 B2 | 6/2004 | Hughes et al. |
| 6,864,501 B2 | 3/2005 | Shields et al. |
| 6,895,091 B1 | 5/2005 | Elliott |
| 7,116,415 B2 | 10/2006 | Iuliano |
| 7,197,523 B2 | 3/2007 | Lutkenhaus et al. |
| 7,242,774 B1 | 7/2007 | Elliott |
| 7,292,342 B2 | 11/2007 | Zaugg |
| 7,317,574 B2 | 1/2008 | Zoller et al. |
| 7,353,148 B1 | 4/2008 | Meyers et al. |
| 7,485,437 B1 | 2/2009 | Rosen et al. |
| 7,486,433 B2 * | 2/2009 | Jarutis et al. ............... 359/326 |
| 7,536,012 B1 | 5/2009 | Meyers et al. |
| 2001/0055389 A1 | 12/2001 | Hughes et al. |
| 2002/0097874 A1 | 7/2002 | Foden et al. |
| 2003/0112970 A1 | 6/2003 | Mitra |

OTHER PUBLICATIONS

D'Angelo, Milena, et al., "Two-Photon Diffraction and Quantum Lithography", Physical Review Letters, vol. 87, No. 1, Jul. 2, 2001, pp. 1-4.

D'Angelo, Milena, et al., "Resolution of quantum and classical ghost imaging", Physical Review A 72. 013810 (2005), The American Physical Society, pp. 1-19.

Einstein, A., et al., "Can Quantum-Mechanical Description of Physical Reality Be Considered Complete?", Physical Review, vol. 47, May 15, 1935, pp. 777-800.

Ferri, F. et al., "High-Resolution Ghost Image and Ghost Diffraction Experiments with Thermal Light", Physical Review Letters, PRL 94, 183602 (2005), The American Physical Society, pp. 1-4.

Gatti, A., et al., "Correlated imaging, quantum and classical", Physical Review A 70, 013802 (2004), The American Physical Society, pp. 1-10.

Letter entitled Comment on "Can Two-Photon Correlation of Chaotic Light Be Considered as Correlation of Intensity Fluctuations?", Physical Review Letters, PRL 98, 039301 (2007), The American Physical Society, p. 1.

Glauber, Roy J., "Coherent and Incoherent States of the Radiation Field", Physical Review, vol. 131, No. 6, Sep. 15, 1963, pp. 2766-2788.

Glauber, Roy J., "The Quantum Theory of Optical Coherence", Physical Review, vol. 130, No. 6, Jun. 15, 1963, pp. 2529-2539.

Brown, R. Hanbury, "Correlation Between Photons in Two Coherent Beams of Light", Nature, No. 4497, Jan. 7, 1956, pp. 27-29.

Brown, R. Hanbury, "A Test of a New Type of Stellar Interferometer on Sirius", Nature, vol. 178, Nov. 10, 1956, pp. 1046-1048.

Shi Jun; Zhang Xiaoling; Yang Jianyu;"New Lasar Fast 3-D Imaging Method Via Wavelet Approximation," 2008 IEEE International Geoscience & Remote Sensing Symposium Jul. 6-11, 2008 | Boston, Massachusetts, U.S.A.

Barry L. Stann, John F. Dammann, and Mark M. Giza, "MEMS-scanned ladar sensor for small ground robots," Proc. SPIE, vol. 7684, 76841E (2010); doi:10.1117/12.850388 Online Publication Date: Apr. 29, 2010.

Artur K. Ekert, Quantum Cryptography Based on Bell's Theorem, Physical Review Letters, vol. 67, No. 6, Aug. 5, 1991.

Shapiro, J. "Ghost Imaging: From Quantum to Classical to Computational," Research Laboratory of Electronics, www.rle.mit.edu/qoptics Nov 17, 2008.

Jun, et al. "A New Lasar Fast 3-D Imaging Method Via Wavelet Approximation," Geoscience and Remote Sensing Symposium, 2008. IGARSS 2008. IEEE International; Issue Date: Jul. 7-11, 2008; pp. IV-1296-IV-1299; Boston, MA.

Aliberti, K, "Characterization of InGaAs self-mixing detectors for chirp, amplitude modulated LADAR (CAML)," Laser Radar Technology and Applications IX. Edited by Kamerman, Gary W. Proceedings of the SPIE, vol. 5412, pp. 99-110 (2004).

Aliberti, K, "Characterization of InGaAs self-mixing detectors for Amplitude-Modulated LADAR," Abstract, Electrochemical Society.

Meyers, et al., "Ghost-imaging experiment by measuring reflected photons," Physical Review A, vol. 77, Issue 4, id. 041801 published Apr. 8, 2008.

Meyers, et al. "A New Two-photon Ghost-imaging Experiment with Distortion Study," Journal of Modern Optics, 54, 2381-2392 (2007).

J.D. Fransen, "Bell Inequality for Position and Time," Physical Review Letters, vol. 62, No. 19, May 8, 1989.

N. Gisin, et al., "Quantum Cryptography and Long Distance Bell Experiments: How to Control Decoherence," University of Geneva, Geneva Switzerland, Jan. 15, 1999.

G. Ribordy, et al., "Long-Distance Entanglement-based Quantum Key Distribution," Physical Review A. vol. 63, 012309-1-12. Dec. 13, 2000.

D. S. Naik, "Entangled State Quantum Cruptography: Eavesdropping on the Eked Protocol," Physical Review Letters, vol. 84, No. 20, pp. 4733-4736.

T. Jennewein, "Quantum Cryptography with Entangled Photons," Physical Review Letters, vol. 84, No. 20, pp. 4729-4732.

C. Elliott, "Buiilding the Quantum Network," New Journal of Physics 4, 46, Jul. 12, 2002.

G. Jaeger & A. Sergienko, "Multi-photon Quantum Inferometry," Progress in Optics 42, Chapter 5, pp. 277-324 (2001).

Award/Contract No. F30602-01-C-0170, Effective Date Aug. 10, 2001 Between Air Force Research Laboratory and BBNT Solutions LLC.

U.S. Appl. No. 60/456,871 to Elliott, et al., filed Mar. 21, 2003, entitled "Quantum Key Distribution Apparatus Based on Entangled Photons."

Koashi, et al. "Probabilistic Manipulation of Entangled Photons" Physical Review A. vol. 63, 030301-1-4.

W. Tittel, et al."Violations of Bell Inequalities by Photons More Than 10 km Apart,", Phys Rev. Lett., 81, pp. 3563-3566 (1998).

Walton, et al., "Performance of Photon-Pair Quantum Key Distribution Systems," (2001) .Journal of Modern Optics, vol. 48, Issue 14 Nov. 2001 , pp. 2055-2063.

Nasr et al. "Biphoton Focusing for Two-photon Excitation," Jan. 17, 2002, The American Physical Society, p. 1-6.

Gisin, Nicholas, et al. "Quantum Cryptography," Review of Modern Physics, VOI 74, Jan. 2002, pp. 145-196.

J.D. Franson, et al. Quantum Cryptography Using Optical Fibers, Applied Optics, (1994) vol. 33, No. 14, pp. 2949-2954.

J.D. Fransen, "Operational System for Quantum Cryptography," Electronics Letters, Feb. 2, 1995, Voi. 31, No. 3, p. 232-4.

B.C. Jacobs, "Quantum Cryptography in Free Space," Nov. 15, 1996, Optics Letters, vol. 21, No. 22, p. 1854-1856.

Hughes, Richard, "Practical Quantum Key Distribution Over a 48 KM Optical Fiber Network," by RG, Hughes, et al., J, Mod, OPT 47, 533-47 (2000).

Hughes, et al. "Free Space Quantum Distribution in Daylight," J, Mod, OPT 47, 549-562 (2000).

Walton, Zachary, et al., "One-Way Entangled-Photon Autocompensating Quantum Cryptography," J Physical Review A v, 67, 052309 (2003).

Barbosa, et al., "Secure Communication Using Mesoscopic Coherent States, Apr. 21 2003, arXiv:quant-ph/0212018v2., Phys, Rev, Lett" 90, 227901 (2003).

Migdall, A. "Tayloring Single and Multiphoton Probabilities of a Single Photon On-Demand Source," Phys, Rev, A, 66, 053805 (2002).

Shelton, et al., "Degenerate Noncollinear Emission from a Type I Collinear Parametric Oscillator," Jul. 2, 2001, vol. 9, No. 1, Optics Express 16-23.

Bennett, Charles H. et al., "Quantum Cryptography Using Any Two Nonorthogonal States" Physical Review Letters, vol. 68, No. 21, May 25, 1992, pp. 3121-3124.

Bennett, Charles H. et al., "Purification of Noisy Entanglement and Faithful Teleportation via Noisy Channels," Physical Review Letters, vol. 76, No. 5, Jan. 29, 1996, pp. 722-725.

Shih, et al "Two-Photon Geometric Optical Imaging and Quantum 'Cypto-Fax:" SPIE Proceedings, vol. 2799. pp. 164-171 (1996).

Jost, B.M. "Spatial Correlations of Spontaneously Down-Converted Photon Pairs Detected With a Single-Photon Sensitive CCD Camera," Optics Express, 3, pp. 81-87 (1998).

Wang, Kaige, et al., "Coincidence Subwavelength Interference by a Classical Thermal Light", arXiv:quant-ph/0404078v1, Apr. 13, 2004, pp. 1-6.

Einstein, A., et al., "Can Quantum-Mechanical Description of Physical Reality Be Considered Complete?", Physical Review, vol. 47, May 15, 1935, pp. 777-780.

Cao, De-Zhong, et al., "Geometrical Optics in Coincidence Imaging System", arXiv:quant-ph/0407065v1, Jul. 8, 2004, pp. 1-9.

Scarcelli, et al., "Scarcelli, Berardi, and Shih Reply," Physical Review Letters, PRL 98, 039302 (2007), The American Physical Society, p. 1.

Valencia, Alejandra, et al., "Two-Photon Imaging with Thermal Light", Physical Review Letters, PRL 94, 063601 (2005), pp. 1-4.

Strekalov, D.V., et al, "Observation of Two-Photon "Ghost" Interference and Diffraction", Physical Review Letters, vol. 74, No. 18 (1995), The American Physical Society, pp. 3600-3603.

Scarcelli, Giuliano, et al., "Can Two-Photon Correlation of Chaotic Light Be Considered as Correlation of Intensity Fluctuations?", Physical Review Letters, PRL 96, 063602 (2006), pp. 1-4.

Pittman, T.B., et al., "Optical imaging by means of two-photon quantum entanglement", Physical Review A (Atomic, Molecular, and Optical Physics),, vol. 52, No. 5, Nov. 1995, pp. R3429-R3432.

Meyers, Ronald E., et al., "Quantum Ghost Imaging Experiments", Proc. Of SPIE vol. 6305, 6305N-1, pp. 1-14 (2006).

Klyshko, D.N., "A simple method of preparing pure states of an optical field, of implementing the Einstein-Podolsky-Rosen experiment, and of demonstrating the complementarity principle", Methodological Notes, Sov. Phy. Usp. 31 (1), Jan. 1988, American Institute of Physics, pp. 74-85.

Bennink, Ryan S., et al., "Two-Photon" Coincidence Imaging with a Classical Source, Physical Review Letters, vol. 89, No. 11, Sep. 9, 2002, The American Physical Society, pp. 1-4.

Boto, Agedi N., et al., "Quantum Interferometric Optical Lithography: Exploiting Entanglement to Beat the Diffraction Limit", Physical Review Letters, vol. 85, No. 13, Sep. 25, 2000, The American Physical Society, pp. 2733-2736.

Brown, R. Hanbury, "The Question of Correlation Between Photons in Coherent Light Rays", Nature, No. 4548, Dec. 29, 1956, pp. 1447-1450.

Klyshko, D.N., "Combined EPR and Two-Slit Experiments: Interference of Advanced Waves", Physics Letters A, vol. 132, No. 6.7, pp. 299-304 (1988).

Zhang, Da, et al., "Correlated two-photon imaging with true thermal light", Optics Letters, vol. 30, No. 18, Sep. 15, 2005, pp. 2354-2356.

Meyers, Ron, et al., "A new two-photon ghost imaging experiment with distortion study", Journal of Modern Optics, vol. 54, Nos. 16-17, 10-20 Nov. 2007, 2381-2392.

Meyers, Ron, et al., "Ghost-imaging experiment by measuring reflected photons", Physical Review A 77, 041801(R), (Apr. 8, 2008), pp. 1-4.

A.V. Sergienko, et al., "Two-photon geometric optical imaging and quantum 'cryptoFAX'" Proc. SPIE Int. Soc. Opt. Eng.(2799), p. 164-171, 1996.

Spiller, "Quantum Information Processing: Cryptography, Computation, and Teleportation," Proceedings of the IEEE Dec. 1996 vol. 84 Issue:12, pp. 1719-1746 ISSN: 0018-9219.

Jennewein, Thomas, et al. "Experimental Nonlocality Proof of Quantum Teleportation and Entanglement Swapping," Physical Review Letters vol. 88, No. 1, (Jan. 2002) 124-141.

Jennewein, Thomas, et al., "Quantum Communication and Teleportation Experiments Using Entangled Photon Pairs (Dissertation zur Erlangung des Grades)"Doktor der Naturwissenschafen Jun. 2002.

Roisse, et al. "Walk-off and Phase-compensated Resonantly Enhanced Frequency-doubling of Picosecond Pulses Using Type II Nonlinear Crystal," Applied Physics B: Lasers and Optics, vol. 69, No. 1, 25-27, DOI: 10.1007/s003400050764 (1999).

Ruff, et al., "Performance of an FM/cw prototype ladar using a 32-element linear self-mixing detector array,"Applied Physics B: Lasers and Optics, vol. 69, No. 1, 25-27, DOI: 10.1007/s003400050764 (2003).

Meyers, R, "Diffraction Free Light Source for Ghost Imaging of Objects Viewed Through Obscuring Media," Army Research Laboratory, Adelphi, MD 20783-1197, ARL TR-5095, Feb. 2010.

Meyers, et al. "Entangled and non-line-of-sight (NLOS) free-space photon quantum communication," Journal of Optical Networking, vol. 4, Issue 9, pp. 573-584 (2005) doi:10.1364/JON.4.000573.

* cited by examiner

Integrated Thru Distance 2 Ghost Image

Integrated Thru Distance 11 Ghost Image

FIG. 29 Integrated Thru Distance 19 Ghost Image

FIG. 30 SUM OF ALL BESSEL ILLUMINATION PATTERNS USED CROPPED TO AREA OF INTEREST

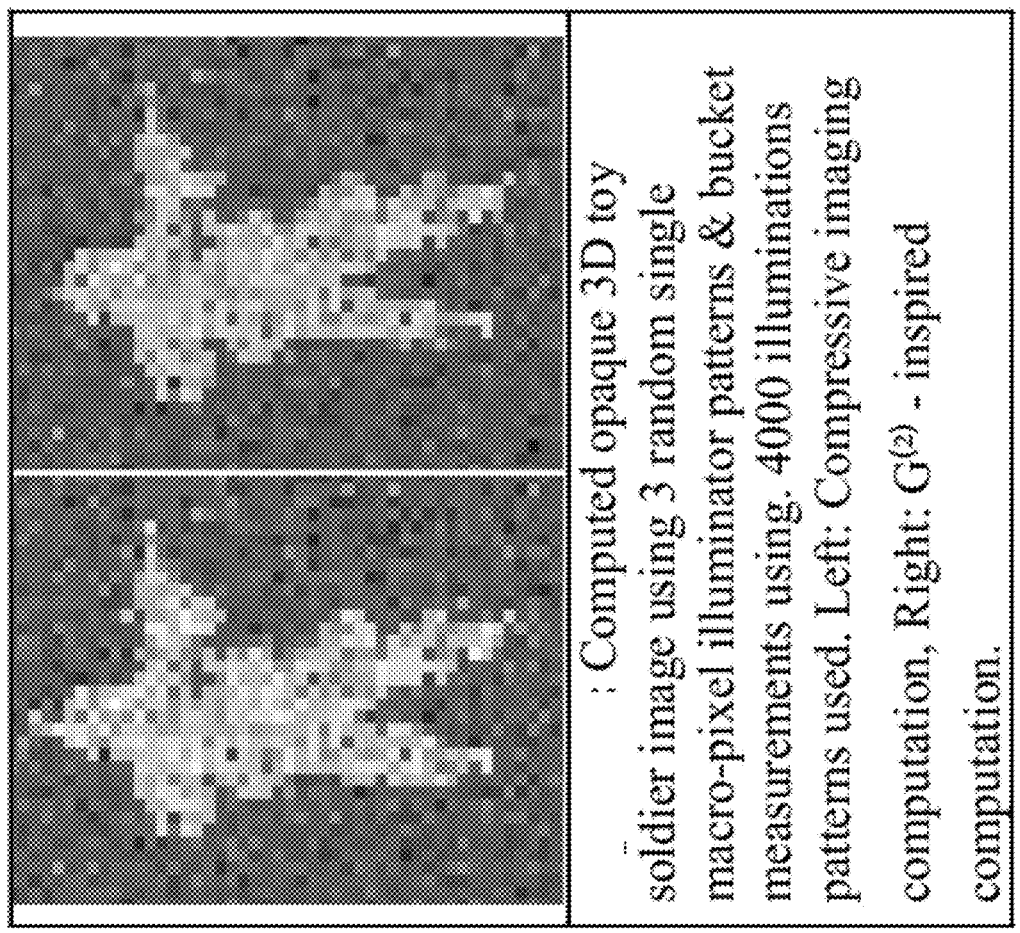
FIG. 36: Computed opaque 3D toy soldier image using 3 random single macro-pixel illuminator patterns & bucket measurements using 4000 illuminations patterns used. Left: Compressive imaging computation, Right: $G^{(2)}$ - inspired computation.

US 8,242,428 B2

METHOD AND SYSTEM FOR LIDAR USING SPATIAL INFORMATION FROM A LIGHT SOURCE IN COMBINATION WITH NONSPATIAL INFORMATION INFLUENCED BY THE SUBJECT TO DERIVE AN IMAGE

CROSS-REFERENCE TO RELATED APPLICATIONS

This application claims priority of U.S. patent application Ser. No. 12/330,401, entitled "Method and System for Creating an Image Using Quantum Properties of Light Based Upon Spatial Information From a Second Light Beam Which Does not Illuminate the Subject," filed Dec. 8, 2008, which claims priority to U.S. Provisional Patent Application Ser. No. 60/993,792 filed Dec. 6, 2007; which are both incorporated by reference herein. This application claims priority of U.S. patent application Ser. No. 12/343,384 filed Dec. 23, 2008, entitled "Method and System for Quantum Imaging Using Entangled Photons Pairs," which claims priority of U.S. patent application Ser. No. 12/330,401, filed Dec. 8, 2008, which claims priority to U. S. Provisional Patent Application Ser. No. 60/993,792 filed Dec. 6, 2008, and U.S. patent application Ser. No. 10/900,351, filed on Jul. 28, 2004, which in turn claims priority to U.S. Provisional Application No. 60/493,107, filed Aug. 6, 2003, which are incorporated herein by reference.

GOVERNMENT INTEREST

The invention described herein may be manufactured, used, and licensed by or for the United States Government.

BACKGROUND OF THE INVENTION

Quantum imaging is a new science that is developing new technology such as Quantum Ghost Imaging (QGI) to exploit quantum optical information. QGI increases versatility in imaging objects of interest. The imaging is adaptable to adverse imaging situations and there is a benefit to exploiting quantum optical information to image objects through partially obscuring media, i.e., optical turbulence, obstructions, smoke, and fog. Imaging through obscuring media is difficult; such as the difficulty of driving in foggy weather.

Quantum entanglement is a quantum mechanical phenomenon in which the quantum states of two or more quantum particles are linked together such that the quantum state of one quantum particle appears to interact with its counterpart; even though the individual quantum particles may be spatially separated. This apparent interconnection leads to correlations between observable physical properties of remote systems, since the interaction of the remote system with quantum state of one of a pair can be observed though observation of the counterpart. For example, according to quantum mechanics, the spin of a quantum particle is indeterminate until such time as some physical intervention is made to measure the spin; which, in general, could equally be spin-up or spin-down. However, when two members of an entangled pair are measured, one will always be spin-up and the other will be spin-down, regardless of the distance between the two particles. It is normally taught in quantum theory that no hidden variable theory can account for these results of quantum mechanics. The statistics of multiple measurements must generally relate to an inequality (called Bell's inequality), which is violated both by quantum mechanical theory and experimental results.

The non-classical two-photon interaction or quantum entanglement was described by Albert Einstein et al. (Einstein, Podolsky, Rosen paradox), "Can Quantum-Mechanical Description of Physical Reality Be Considered Complete?" Physical Review, Volume 47, May 15, 1935, pgs. 777-800. The paradox of quantum entanglement, as described therein, relates to the concept that as a result of the process of measurement of a first system, using quantum mechanics, two different physical quantities are obtainable in the second system, despite the fact that at the time of the measurements, the two systems no longer interact and the second system is not disturbed in any way by the first. Einstein, et al, were unable to reconcile this quantum mechanical description of reality with the so-called classical physics determination that no "real" change can take place in the second system as a consequence of anything that may be done to the first system after the two systems no longer interact.

The theoretical work reported by Klyshko in "Combined EPR and Two-Slit Experiments: Interference of Advanced Waves", Physics Letters A, Volume 132, number 6.7, pp. 299-304 (1988) see also, Sov. Phys. Usp. 31, 74 suggested a non-classical two-photon interaction could exist.

The first two-photon imaging experiment was reported by Pittman et al., in "Optical Imaging by Means of Two-photon Quantum Entanglement," Physical Review, A, Vol. 52, No. 5, November 1995. According to the Pittman article, a two-photon optical imaging experiment was performed to test the two-particle entanglement as described by Albert Einstein et al. (Einstein, Podolsky,Rosen), referenced above, to determine if there was a correlation in position and in momentum for an entangled two-photon system; using "test beam or path" and "reference beam or path" photon pairs. Specifically, an aperture placed in front of a fixed detector was illuminated by a signal beam through a convex lens. A sharp magnified image of the aperture was found in the coincidence counting rate when a mobile detector was scanned in the transverse plane of the reference beam at a specific distance in relation to the lens. The experiment was named "ghost imaging" due to its surprising nonlocal feature.

Additional experiments are reported in Pittman, et al. "Optical Imaging by Means of Two-Photon Entanglement," Phys. Rev. A, Rapid Comm., Vol. 52, R3429 (1995) and ghost interference by Strekalov, et al, "Observation of Two-Photon 'Ghost' Interference and Diffraction," Phys. Rev. Lett., Vol. 74, 3600 (1995), which together stimulated the foundation of quantum imaging in terms of multi-photon geometrical and physical optics.

Boto and colleagues (Boto, Agedi, et al.), in "Quantum Interferometric Optical Lithography: Exploiting Entanglement to Beat the Diffraction Limit", Physical Review Letters, Volume 85, Number 13, 25 September 2000, The American Physical Society, pgs. 2733-2736, developed an entangled multi-photon system for sub-diffraction-limited imaging lithography and proposed a heuristic multiphoton absorption rate of a "noon" state and proved that the entangled N-photon system may improve the spatial resolution of an imaging system by a factor of N, despite the Rayleigh diffraction limit. The working principle of quantum lithography was experimentally demonstrated by D'Angelo, Milena, et al., in "Two-Photon Diffraction and Quantum Lithography", Physical Review Letters, Volume 87, Number 1, Jul. 2, 2001, pgs. 1-4, by taking advantage of an entangled two-photon state of spontaneous parametric down-conversion. Applications relating to quantum entanglement have been described, inter alia, in a series of patent applications by the present inventors.

Quantum-inspired Ghost-imaging, as used herein, refers to techniques such as those disclosed in U.S. Pat. No. 7,536,012

('012 Patent), to R. Meyers and K. Deacon, entitled "Entangled Quantum Communications and Quantum Imaging," filed Jul. 28, 2004 (provisional filing date Aug. 6, 2003). The '012 Patent discloses, inter alia, an apparatus for generating a shared quantum key between a sender and a receiver comprising a sending apparatus which generates entangled photon pairs, and a receiving apparatus. The shared quantum key is generated from stochastic temporal coincidences between sender photon detection data and receiver photon detection data shared over the communication link. The '012 Patent further discloses an apparatus for image transmission from a sender to a receiver with the sending apparatus including a source of entangled photons providing an entangled beam, a beamsplitter, an image generator, and a beam recombiner, the entangled beam being incident on the beamsplitter, the beamsplitter providing a first beam which illuminates the image generator, and a second beam which does not interact with the image generator, the beam recombiner combining the first beam and the second beam into a transmitted beam which is then sent to the receiving apparatus. The receiving apparatus comprises a receiver beamsplitter, a first receiver detector for providing first receiver data, a second receiver detector for providing second receiver data, and a coincidence circuit. The transmitted beam is split by the receiver beamsplitter into a first receiver beam incident on the first receiver detector, and a second receiver beam incident on the second receiver detector. The coincidence circuit reconstructs the image from determined coincidences between the first receiver data and the second receiver data.

In application Ser. No. 12/343,384, to R. Meyers and K. Deacon, entitled "Method and System for Quantum Imaging Using Entangled Photons Pairs," filed Dec. 23, 2008, hereby incorporated by reference, there is disclosed a system using entangled photon pairs in which a first part of entangled pair is sent towards a target while a second part is sent along a reference path for future measurement. If the first part of the entangled photon pair is absorbed or reflected by the target, it will effect a property (e.g., spin, polarization, transverse momentum, angular momentum, color) of the photon. The influence by the target is also reflected in the reference photons. By knowing the time of flight, one can determine the distance that the reference photon travels. Similarly, by identifying reference photons which exhibit changed characteristics (such as color, spin, polarization), one can determine the possible existence of a target or object in the target space; i.e., it can determined whether it is likely or unlikely that there was a target in the space based upon the reference path entangled photon that travelled during the same time period.

In application Ser. No. 12/330,401, to R. Meyers and K. Deacon, entitled "Method and System for Creating an Image Using Quantum Properties of Light Based Upon Spatial Information From a Second Light Beam Which Does not Illuminate the Subject" [ARL07-33] filed Dec. 8, 2008, hereby incorporated by reference, in a preferred embodiment, incoherent, partially coherent, chaotic or entangled light source is reflected from a subject target into a bucket detector which does not process spatial information and in effect, merely measures the "quantity" of light reflected from the subject into the bucket detector. A second detector is a spatial detector illuminated by the light source. Using spatial information from the second detector in conjunction with the light measurement from the first detector, an image is generated using coincidence circuitry.

As discussed in the '401 Application, The ability to image through obscuring media (e.g., smoke or clouds) remains a problem in a variety of fields, such as satellite imaging analysts, firefighters, drivers, oceanographers, astronomers, military personnel, and medical personnel. The ability to improve resolution in each of these exemplary instances represents an opportunity to derive more information from images and presumably the decisions made from such images. By way of example, improved resolution in x-ray or endoscopy medical imagery facilitates lower radiation dosing and diagnosis of abnormal morphologies earlier than currently possible with conventional imaging methodologies. Conventional imaging techniques have, to a large extent, arrived at the theoretical limits of image resolution owing to wavelength-limited resolution, optical element distortions, and the reflective interaction between photons and an object to be imaged.

FIG. 1 is a prior art Lidar (Light Detection and Ranging), sometimes referred to as laser radar. Light transmitted by a laser 11 is directed at a target area (not shown) and the back scattered (or reflected) light is received by an optical telescope mirror 2. A light guide 3 transmits the light to a detector 4 and the results are recorded on recorder 5 converted to logged data files and stored in a computer 20, which also operates (or fires) the laser.

Currently, there is a need for improvement and miniaturization of ladar capability for use on unmanned aerial vehicles (UAV), UGS and UGV platforms. Attempts at other solutions to image by penetration of obscurants have involved use of different wavelengths and polarimetry. In cases in which these techniques are not effective, do not produce three dimensional information, or when they cannot be employed it would be helpful to have small package three dimensional imaging methods such as Ghost Ladar to penetrate obscuring media such as smog and fog to produce three dimensional images.

A number of near-infrared, prototype laser detection and ranging (LADAR) Systems have been developed based on the chirp, amplitude-modulated LADAR (CAML) architecture. The use of self-mixing detectors in the receiver, that have the ability to internally detect and down-convert modulated optical signals, have significantly simplified the LADAR design. Single-pixel, self-mixing, InGaAs-based, metal-semiconductor-metal detectors have been designed, the details of which are set forth in Aliberti, et al., "Characterization of InGaAs self-mixing detectors for chirp amplitude-modulated ladar (CAML)," Proc. SPIE, Vol. 5412, 99 (2004); doi: 10.1117/12.542072 Online Publication Date: 20 Oct. 2004, hereby incorporated by reference.

For ease of understanding, the terminology "test path" may be used to designate the path or beam of the photon(s) entering the object or target area. The terminology "reference path" will be used to designate the beam or path that the reference photon(s) travels.

Quantum imaging has so far demonstrated two peculiar features: (1) reproducing ghost images in a "nonlocal" manner, and (2) enhancing the spatial resolution of imaging beyond the diffraction limit. Both the nonlocal behavior observed in the ghost imaging experiment and the apparent violation of the uncertainty principle explored in the quantum lithography experiment are due to the two-photon coherent effect of entangled states, which involves the superposition of two-photon amplitudes, a nonclassical entity corresponding to different yet indistinguishable alternative ways of triggering a joint-detection event in the quantum theory of photodetection as articulated by Glauber in "The Quantum Theory of Optical Coherence", Physical Review, Volume 130, Number 6, pp. 2529-2539, Jun. 15, 1963, and "Coherent and Incoherent States of the Radiation Field", Physical Review, Volume 131, Number 6, 15, pp. 2766-2788, September 1963. The nonlocal superposition of two-photon states may never be understood classically. For further discussion, see U.S. application Ser. No. 12/330,401, hereby incorporated by reference. The ongoing lack of theoretical understanding of ghost imaging has hampered efforts to develop reflective ghost imaging systems for practical field uses in such fields as satellite, field, medical and research imaging. Moreover, there exists a need for a system using ghost image where feedback or measurement is not possible at the target area.

Traditionally, imagers have collected two dimensional information on objects in the field of view. Addressing the additional need for range, Ladar systems have been developed to identify the range information at each pixel thus extending images to three dimensions as disclosed in greater detail in "Characterization of InGaAs self-mixing detectors for chirp, amplitudemodulated LADAR (CAML)" by Keith Alibertia, et al. U.S. Army Research Laboratory, 2800 Powder Mill Road Adelphi, Md. 20783, hereby incorporated by reference.

There are generally two types of Lidars, one which measures the time delay using short pulses of laser light and the other uses time delay using modulated waveforms. While Lidar systems are an extension of two dimensional images that incorporate range in the third dimension, augmentation of their capability is needed; particularly when considering utilization of Lidar systems in all types of adverse imaging situations, where there is a benefit to the exploitation of three dimensional quantum optical information to image objects through partially obscuring media, i.e., smoke, fog and optical turbulence. Lidar systems have had some limited success in penetrating some smoke, fog and clouds, but they have limitations when the scattering or absorption is too large. In addition, Lidar systems require circuitry for time processing of spatial information.

SUMMARY OF INVENTION

The present invention relates in general to a process and apparatus for 3-D imaging. A preferred embodiment has range imaging capability and scattering penetration associated with "Ghost-imaging." The extension of Ghost-imaging capability to three dimensions and miniaturization of lidar enables use on unmanned aerial vehicle (UAV), UGS and UGV platforms.

Attempts at solutions to image by penetration of obscurants have involved the use of different wavelengths and polarimetry. The present invention provides a solution in cases where prior techniques are ineffective or cannot be employed, or when they cannot produce three-dimensional information. A preferred embodiment provides a small package, three dimensional imaging method that is capable of penetrating obscuring media such as smog and fog. A preferred embodiment three-dimensional Ghost-imaging Ladar images objects in three dimensions through adverse imaging scenarios, overcoming scattering challenges, with reduced processing time using photon coincidence measurements.

As shown in FIG. 2, a laser source 11 directs a beam of photons 12 to a target area 13 and a "bucket" detector/sensor 14 located at a distance D1 may be used to measure reflected and scattered photons 12R. A second detector 15 is spaced a distance D2 from the target area 13. A correlation and phase difference calculator 16 calculates the phase difference between sensors 14 and 15. A modulator 17 may be used on laser beam 12 to modulate the temporal and spatial profiles of the beam 12.

An embodiment of the present invention can be used to generate 3-D images from photons that have not interacted with object being imaged. As an example, can be used to detect 3D features of objects which absorb but reflect only minimal light. An embodiment of the present invention provides 3-D Image generation by photons that have never directly interacted with the object being 3-D imaged.

A preferred embodiment Ladar sends out successive pulses of light according to an appropriate changing beam formation and composition to become incident on the target object and surrounding objects and then scatter and reflect. Between successive pulses a single pixel bucket detector will receive reflected and scattered photons as a function of time from each pulse. This is not customary for Ghost-imaging in which ensembles of only a single coincidence time window are usually considered. A lens will be used to collect and focus the return photons onto the photon bucket detector as is customary for Ghost Imaging. A quantum photon mathematical equation will project the reference light intensity from the initial pulse to a down-beam position and intensity value. This will be combined with bucket photon information for an ensemble of pulses to produce coincidence measurements needed for Ladar imaging. Each time interval after initiation of a pulse will correspond to a range distance of an object. Since ghost imaging has a narrow depth of focus each object at each distance can be resolved based on their delay from the initial pulse. The preferred embodiment Ladar imaging of a complicated scene will render in focus all those parts of objects at a given range $r=ct/2$ where t is the time for a Ghost Ladar photon to travel to the object and return. Thus a 3D scene can be constructed from slices of in-focus images returned at each t between pulses. The period between pulses can be delayed to cover all expected returns. Optionally, other methods such as multiplexing can be used to increase frequency of pulses. Optionally, to improve imaging with fewer pulses modern compressive imaging techniques can be used. These may provide approximately a factor of ten decrease in measurements needed.

A preferred embodiment of the present invention provides the ability to obtain correct structured illumination (using, for example, speckles) and obtain accurate timing with many repetitions so as to create a sufficiently large ensemble of measurements. Several types of sensors can be used that can measure optical information at sufficient speeds to resolve in the nanosecond or smaller time intervals. Various alternate techniques include use of single photon counting modules, high speed laser communication hardware, or windowed coincidence detectors and other fast detectors that ensure sufficient time resolution and repetition rate to acquire an ensemble in a short enough time to produce a successful 3-D Ghost Ladar image.

Optionally, the only sensor in Ghost Ladar may be a single pixel photon detector which suggests a myriad of Army Ghost Ladar applications related to UAV, UGS, and UGV platforms such as compressed 3D image acquisition and exfiltration. The research will also test the limits of the ability of the Ghost Ladar to penetrate obscurants.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 36 is a computed opaque 3-D toy soldier image using 3 random single macro-pixel illuminator patterns and bucket measurements using 4000 illuminations patterns: (left) compressive imaging computation and (right) $G(^2)$, the inspired computation.

DESCRIPTION OF THE PREFERRED EMBODIMENTS

Figure 1:
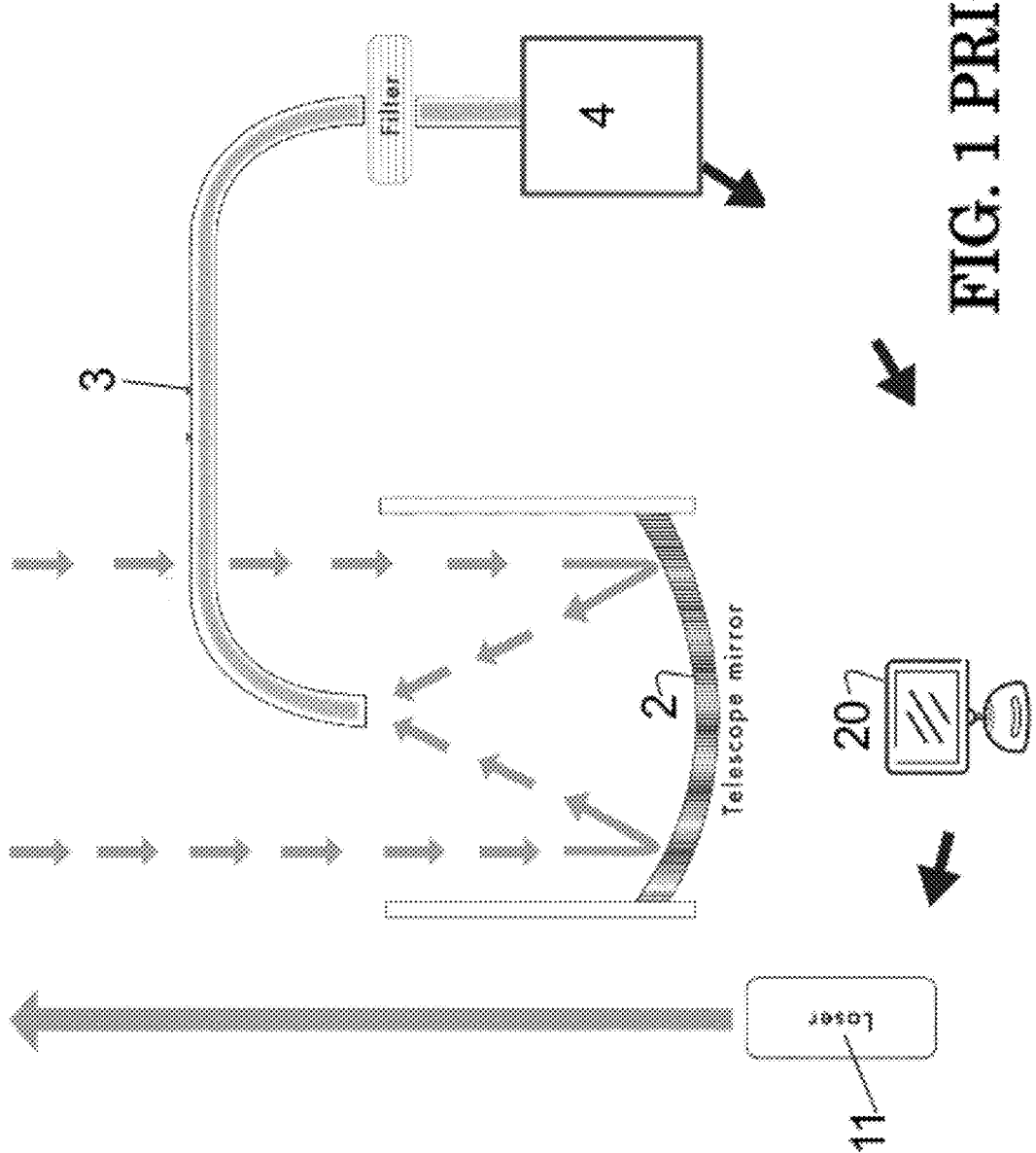
FIG. 1 is a prior art Lidar (Light Detection and Ranging), sometimes referred to as laser radar.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. The terms lidar, Lidar, Ladar and ladar are equivalent for purposes used herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

As used herein the terminology target path, object path, target beam, object beam, test path or test beam refers to the beam or path directed to the target or object space and or area. The terminology reference path or beam relates to the photon path or beam which is detected and/or measured. The terminology is not intended to limit the scope of the invention inasmuch as other terminology could be used to similarly describe similar operating systems.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As used herein the terminology object or target space means an area or space in which a target may or may not be detected. In medical applications, the target may be a body or a component of the body. In environmental applications, the target area may be an area in space which is subject to surveillance. The target subject to surveillance may be an aerial vehicle or the like, a satellite, or an object in space. The target area may also be at ground level and involve areas of the ground or landscape. Accordingly, the invention may be used for purposes of mapping or imaging an area on the ground.

An embodiment of the present invention utilizes a 3D Quantum-Image Ladar capability that is capable of imaging objects in three dimensions through adverse imaging scenarios. That would exploit the Ladar time resolution and photon source capability as well as the quantum-imaging optical information processing to overcome increased scattering challenges. Quantum-imaging exploits quantum optical information using photon coincidence measurements. For Quantum-imaging photon energy needs to be put onto a target and a bucket detector must measure reflected and scattered photons. The energy would be put on target by the ladar part of the quantum ladar and combining it with time resolving ghost imaging technique for producing the quantum ladar three dimensional image.

In a preferred embodiment of the present invention, the ladar 10 will send out successive pulses of light 12 according to an appropriate changing beam formation and composition to become incident (or illuminate) the target object 13 and surrounding objects and then scatter and/or reflect. A modulator 17M may be used to modulate the spatial and temporal profile of the light from the laser 11. The quantum ladar will send out successive pulses of light according to an appropriate changing beam formation and composition to become incident on the target object and surrounding objects and then scatter and reflect. Between successive pulses a single pixel bucket detector will receive reflected and scattered photons as a function of time from each pulse. Successive pulses are divided by the period $2\pi$. A lens may be used to collect and focus the return photons onto the photon bucket detector.

Figure 2:
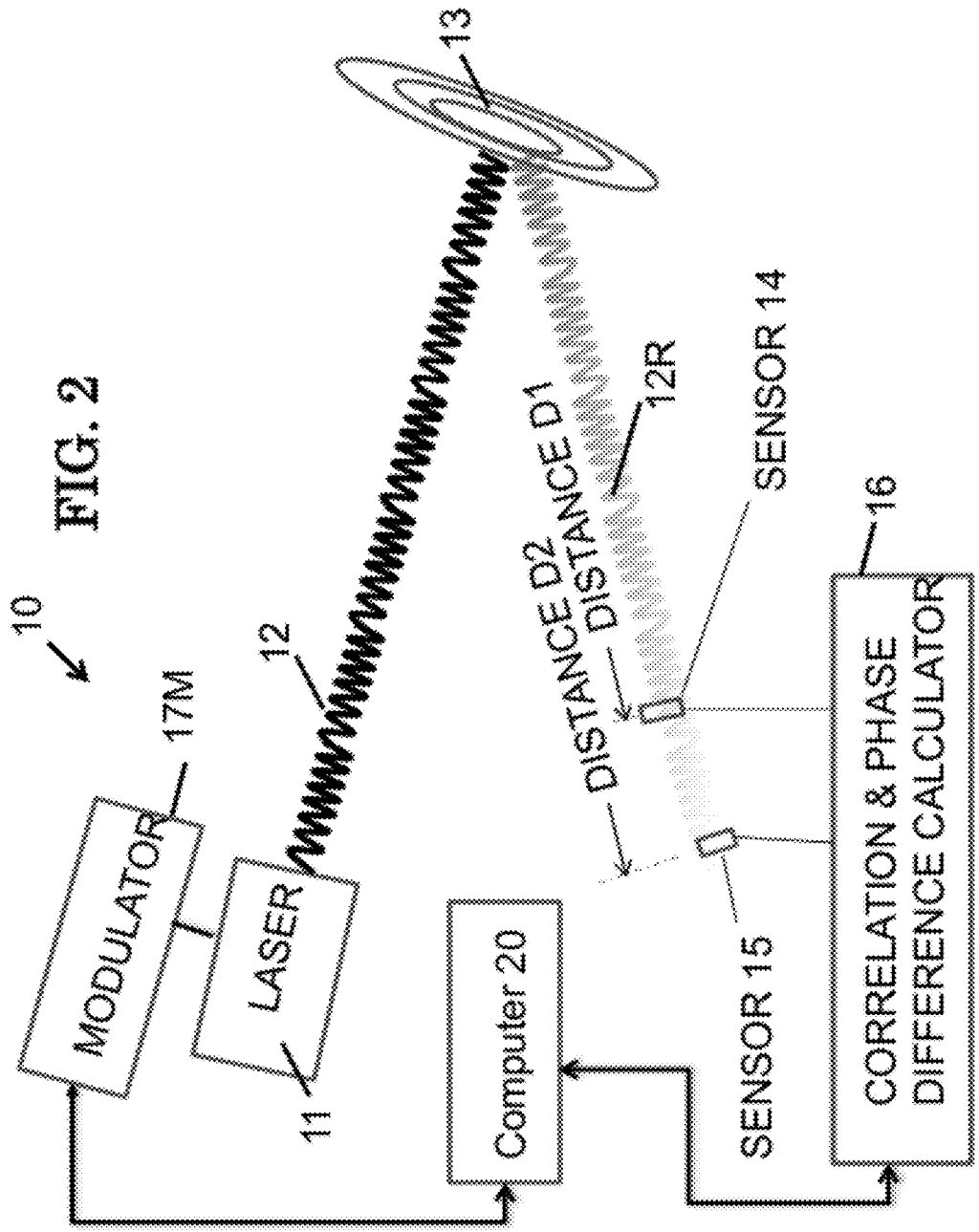
FIG. 2 is schematic system block diagram of a preferred embodiment according to the principles of the present invention comprising, inter alia, a modulator 17M.

In the preferred embodiment shown in FIG. 2, a laser 11 sends out an amplitude modulated speckle light pattern that reflects and scatters due to target object 13. The returned and scattered light is collected by a first detector or sensor 14 at a distance D1. Detector 14 may be a bucket detector. A second detector or sensor 15, which also may be a bucket detector, is positioned at a distance D2 and receives scattered and reflected light. In a preferred embodiment, D1 is not equal to D2. The intensity versus time signals from the two detectors are compared to compute a phase shift between the two received signals at the first and second detectors 14 and 15. The phase shift is proportional to distance and unambiguous us to a 2 pi value of the phase shift; since in the case of a periodic signal having a period of 2 pi, the signal repeats after 2 pi. The image is computed as a function of equivalent time delay from the laser to the object and back to the bucket detectors 14 and 15.

Figure 3:
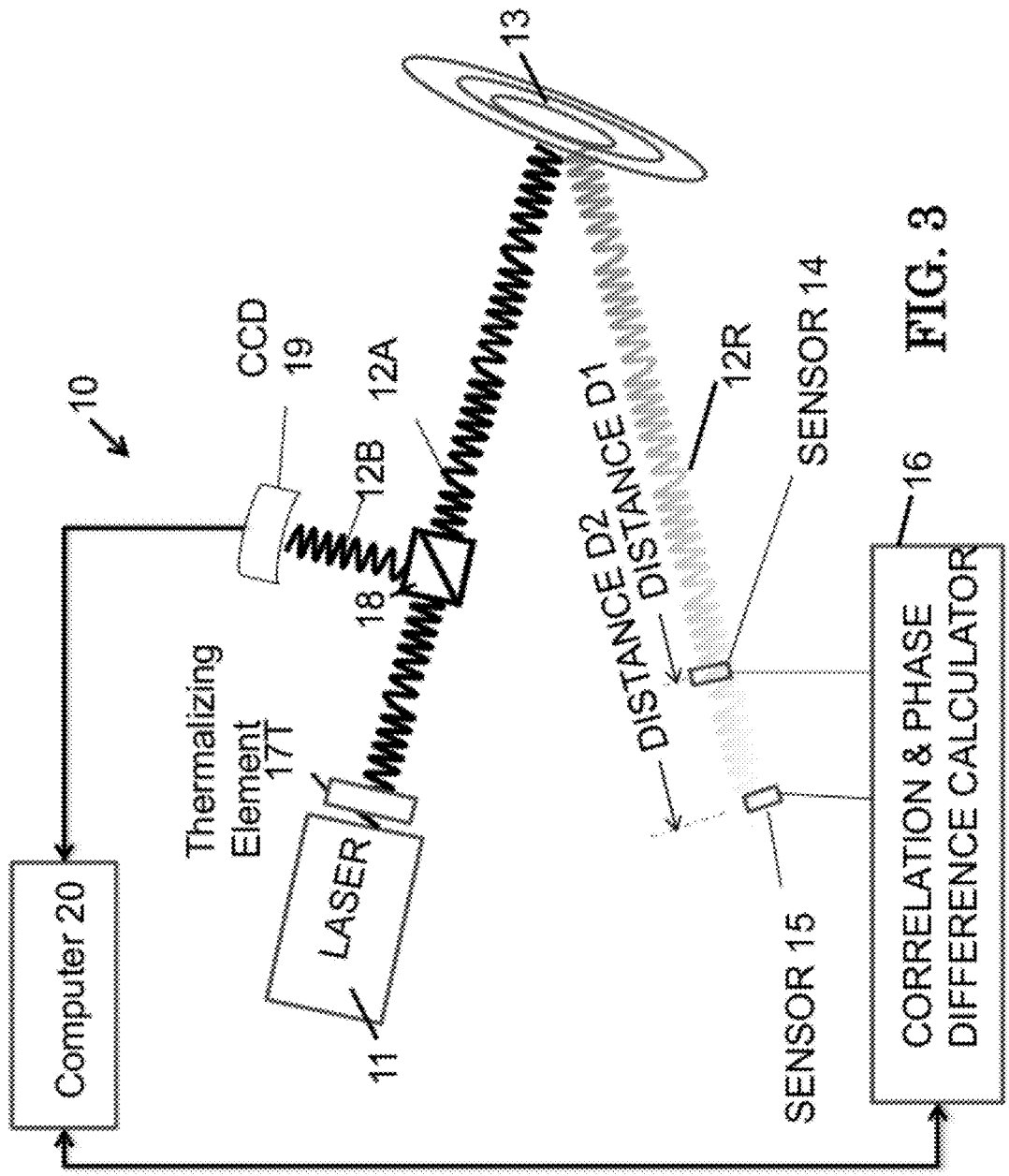
FIG. 3 is schematic system block diagram of a preferred embodiment according to the principles of the present invention comprising, inter alia, a thermalizing element 17T.

Shown in FIG. 3 is another preferred embodiment in which a laser 11 sends light through a thermalizing element 17T which creates a light pattern. A beam splitter 18 is used to split the beam from the laser 11 into a target path 12A and a reference path 12R. The pattern of the beam is recorded by a charge coupled device (CCD) 19 or the like which records spatial information concerning the light pattern as discussed more fully in U.S. application Ser. No. 12/330,401, hereby incorporated by reference. In its simplest terms, CCD is a device for the movement of electrical charge from the detector area (19) to an area where the charge can be manipulated, for example conversion into a digital value. CCDs may be implemented as shift registers that move charge between capacitive bins in the device. The CCD device may be made up of semiconductors arranged in such a way that the electric charge output of one semiconductor charges an adjacent one. The CCD device may be integrated with an image sensor, such as a photoelectric device to produce the charge that is being read for digital imaging. The CCD device 19 may optionally be a camera, photodetector array or a photographic device capable of imaging the beam pattern 12B. The beam pattern comprising the spatial information concerning the light beam 12B is sent to computer 20. Light Beam 12A is directed to the target 13 and the returned and scattered light is collected by a first detector or sensor 14 at a distance Dl. Detector 14 may be a bucket detector, or any kind of detector which has the capability of detecting a photon strike. A second detector or sensor 15, which also may be a bucket detector or any detector having the capability of detecting a photon strike, is positioned at a distance D2 and receives scattered and reflected light. The detectors 14 and 15 are spaced a known distance apart so a phase shift can be computed based upon the speed of light, $\phi=(4\pi*r* f/c$. Detectors 14 and 15 need not be alike; and either may be of a large variety of photo detectors well known to those of ordinary skill in the art. A feature of the preferred embodiments of FIGS. 2 and 3 is that the detectors 14 and 15 need not record spatial information regarding the target 13. Instead, spatial information is recorded by spatial detector 19. The spatial information recorded by spatial detector 19 is transmitted to the computer 20 which combines and correlates this spatial information with the coincidence data received from detectors 14 and 15. For example, the data recorded by a detector 14 or 15 may be transmitted to computer 20 in a form resembling that depicted in FIG. 4, where roughly 200 normalized "bucket" measurements are represented.

The spatial information from detector 19 is combined with the coincidence information from the detectors 14, 15 in computer 20. Computer 20 may be a microprocessor, processor, multiprocessor, CPU, mainframe, or any computing element capable of combining the spatial information from the detector 19 with the coincidence information from detectors 14, 15. Further description of the coincidence detection feature is found in U.S. Pat. No. 7,536,012 and U.S. patent application Ser. No. 12/330,401, both of which are hereby incorporated by reference. Since the photonic information detected by detectors 14 and 15 need not encompass spatial information, but simply indicate the occurrence of a photon returned from the target 13, this capability facilitates the use of the preferred embodiment lidar systems in environments in which the returned photons may be impacted by environmental conditions such as fog, smoke, atmospheric particles and the like. In the preferred embodiments of FIGS. 2 and 3, D1 is not equal to D2. The intensity versus time signals from the two detectors are compared to compute a phase shift between the two received signals at the first and second detectors 14 and 15. The phase shift is proportional to distance and unambiguous us to a 2 pi value of the phase shift; since in the case of a periodic signal having a period of 2 pi, the signal repeats after 2 pi. The image is computed as a function of equivalent time delay from the laser to the object and back to the bucket detectors 14 and 15.

A quantum photon mathematical equation will project the reference light intensity from the initial pulse to a down-beam position and intensity value. This will be combined with "bucket" photon information (such as that exemplified in FIG. 4) for an ensemble of pulses to produce coincidence measurements needed for "ghost" Ladar imaging. The terminology "ghost" relates to the feature that the spatial information is not reflected from the target but is either derived from the modulation of the laser beam in FIG. 2 or the spatial information obtained through the use of beam splitter 18 and detector 19 which records spatial information from a beam which has not "seen" or illuminated the target.

Each time interval after initiation of a pulse will correspond to a range distance of an object. Since "ghost" imaging has a narrow depth of focus each object at each distance can be resolved based on their delay from the initial pulse. Ghost Ladar imaging of a complicated scene will render in focus all those parts of objects at a given range r=ct/2 where t is the time for a Ghost Ladar photon to travel to the object and return. Thus a 3-D scene can be constructed from slices of in-focus images returned at each t between pulses. The period between pulses can be delayed to cover all expected returns. After proof of concept, other methods such as multiplexing can be used to increase frequency of pulses. To improve imaging with fewer pulses modern compressive imaging techniques can be used. Compressive techniques facilitate approximations resulting in decreasing the number of measurements necessary.

The ability to correct structured information (e.g., speckles) and obtain accurate timing with many repetitions so as to create a sufficiently large ensemble of measurements is described further in U.S. Pat. No. 7,536,012 and U.S. patent application Ser. No. 12/330,401, both of which are hereby incorporated by reference.

Figure 4:
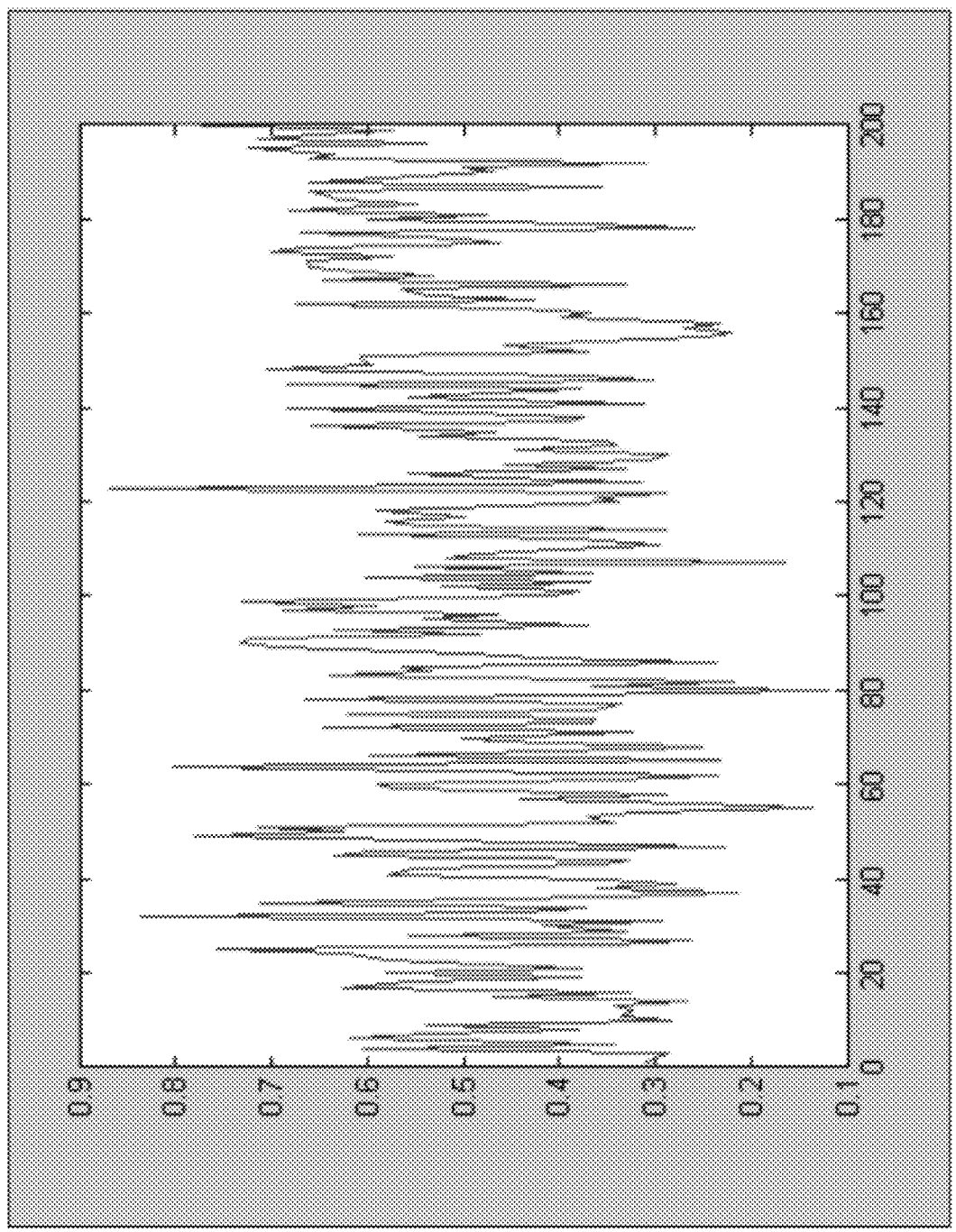
FIG. 4 is an illustration depicting a general example of hits recorded by a bucket detector.
Figure 5:
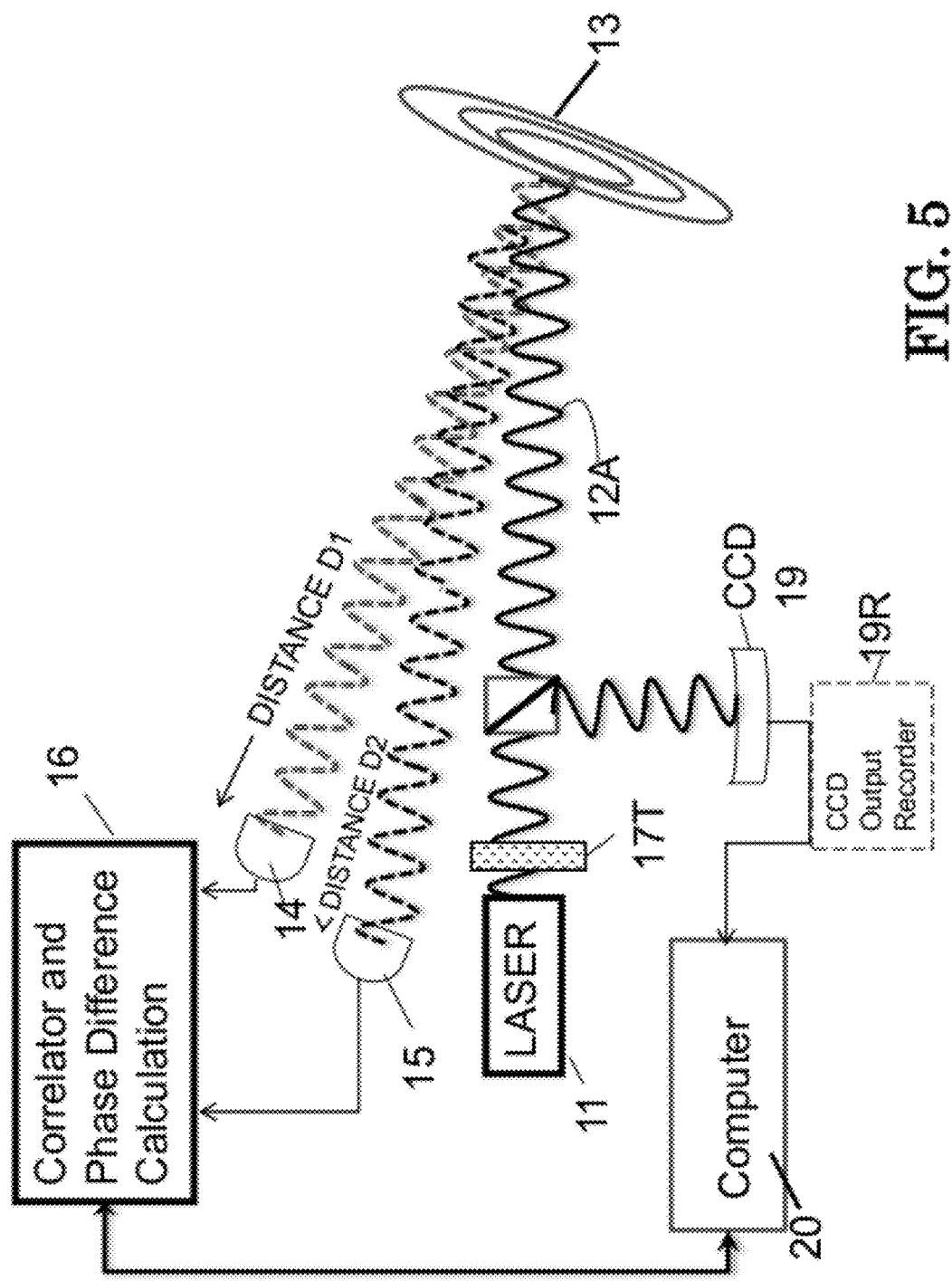
FIG. 5 is schematic system block diagram of a preferred embodiment according to the principles of the present invention comprising, inter alia, a thermalizer 17T.

FIG. 5 illustrates another preferred embodiment of a lidar system constructed in accordance with the principles of the present invention comprising a laser 11 from which a beam of photons passes through a thermalizing element 17T onto a beam splitter 18. A portion of the beam 12B is diverted to a charge coupled device 19 (which may, for example be a photographic imaging device) which records spatial information concerning light beam 12B. The spatial information recorded by spatial detector 19 is transmitted to the computer 20 which combines and correlates this spatial information with the coincidence data received from detectors 14 and 15. For example, the data recorded by a detector 14 or 15 may be transmitted to computer 20 in a form resembling that depicted in FIG. 4, where roughly 200 normalized "bucket" measurements are represented.

The spatial information from detector 19 is combined with the coincidence information from the detectors 14, 15 in computer 20. Computer 20 may be a microprocessor, processor, multiprocessor, CPU, mainframe, or any computing element capable of combining the spatial information from the detector 19 with the coincidence information from detectors 14, 15. Further description of the coincidence detection feature is found in U.S. Pat. No. 7,536,012 and U.S. patent application Ser. No. 12/330,401, both of which are hereby incorporated by reference. Since the photonic information detected by detectors 14 and 15 need not encompass spatial information, but simply indicate the occurrence of a photon returned from the target 13, this capability facilitates the use of the preferred embodiment lidar systems in environments in which the returned photons may be impacted by environmental conditions such as fog, smoke, atmospheric particles and the like. In the preferred embodiments of FIG. 5 D1 is not equal to D2 and detectors 14 and 15 are positioned at different angles from the target 13. The embodiment of FIG. 5 may include a CCD 19R for recording spatial information.

Figure 6:
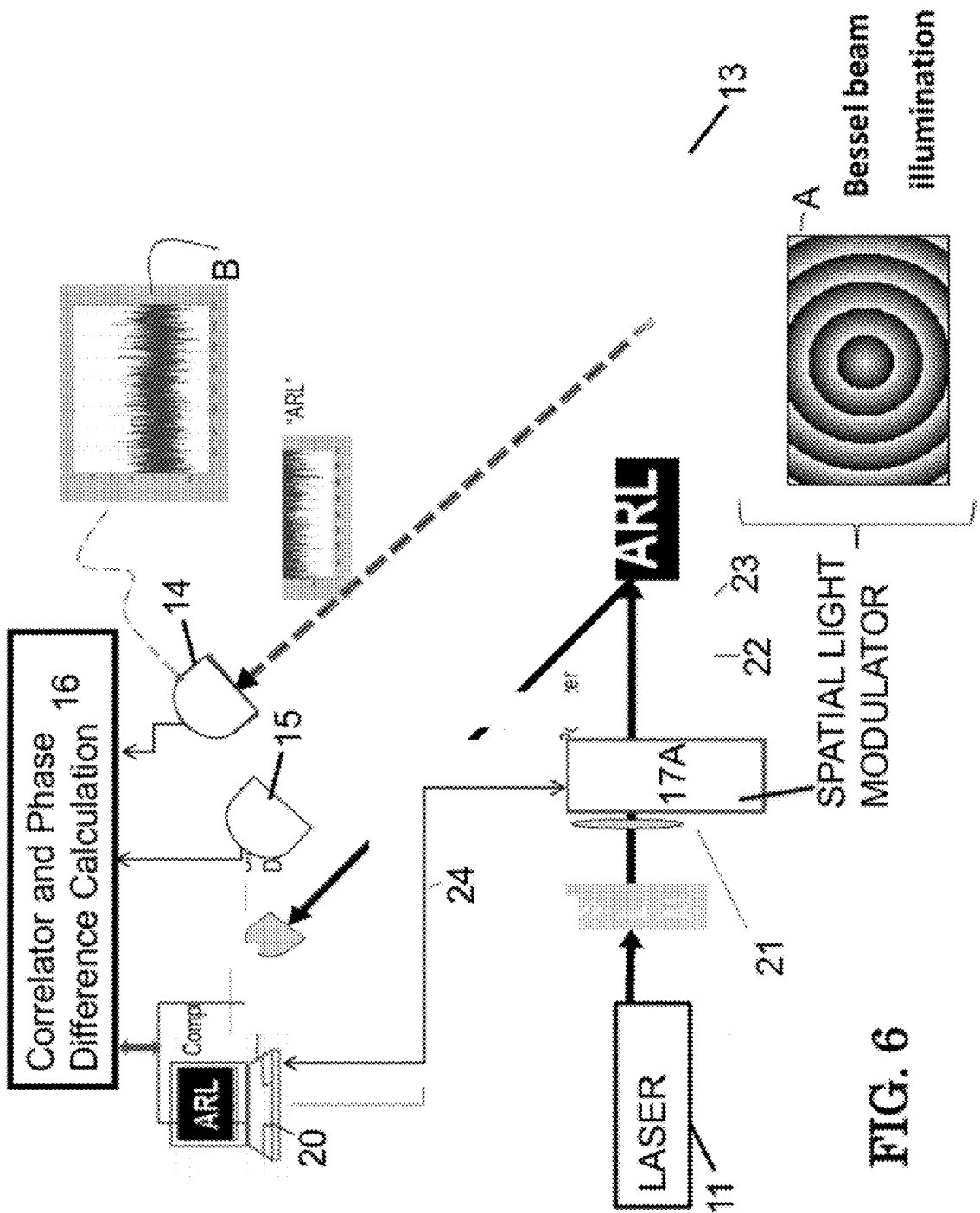
FIG. 6 is schematic system block diagram of a preferred embodiment according to the principles of the present invention comprising, inter alia, a spatial light modulator 17A.

FIG. 6 depicts a preferred embodiment wherein the beam from laser 11 passes through an optional expansion lens 21 into a spatial light modulator 17A. The spatial light modulator forms the beam pattern depicted in insert A of FIG. 6. This beam pattern is received by computer 20 by means of a path 24 which may be a variety of wireless transmission means or a conductor of electronic signals. The modified light beam optionally passes through a focusing lens 22 and polarizer 23 onto target 13. For ease of understanding exemplary target 13 is has the letters "ARL" shown thereon, but the target may be of any nature or configuration. As depicted in FIG. 6, measurements from the illumination patterns reflected and/or scattered off opaque target 13 are received by detectors 14 and 15. One pattern of bucket measurements is depicted in the insert B shown in FIG. 6. A correlation and phase difference calculation element 16 correlates the detection signals from detectors 14 and 15 to derive the three dimensional target information. Detectors 14 and 15 are at different distances D1 and D2 from the target. Generally speaking, knowing the speed of light and quantum properties of light, three-dimensional information concerning the target 13 is derived. However, in the case shown in FIG. 6, the information transmitted to computer 20 results in the imaging of the "ARL" target 13 on the computer 20.

Figure 7:
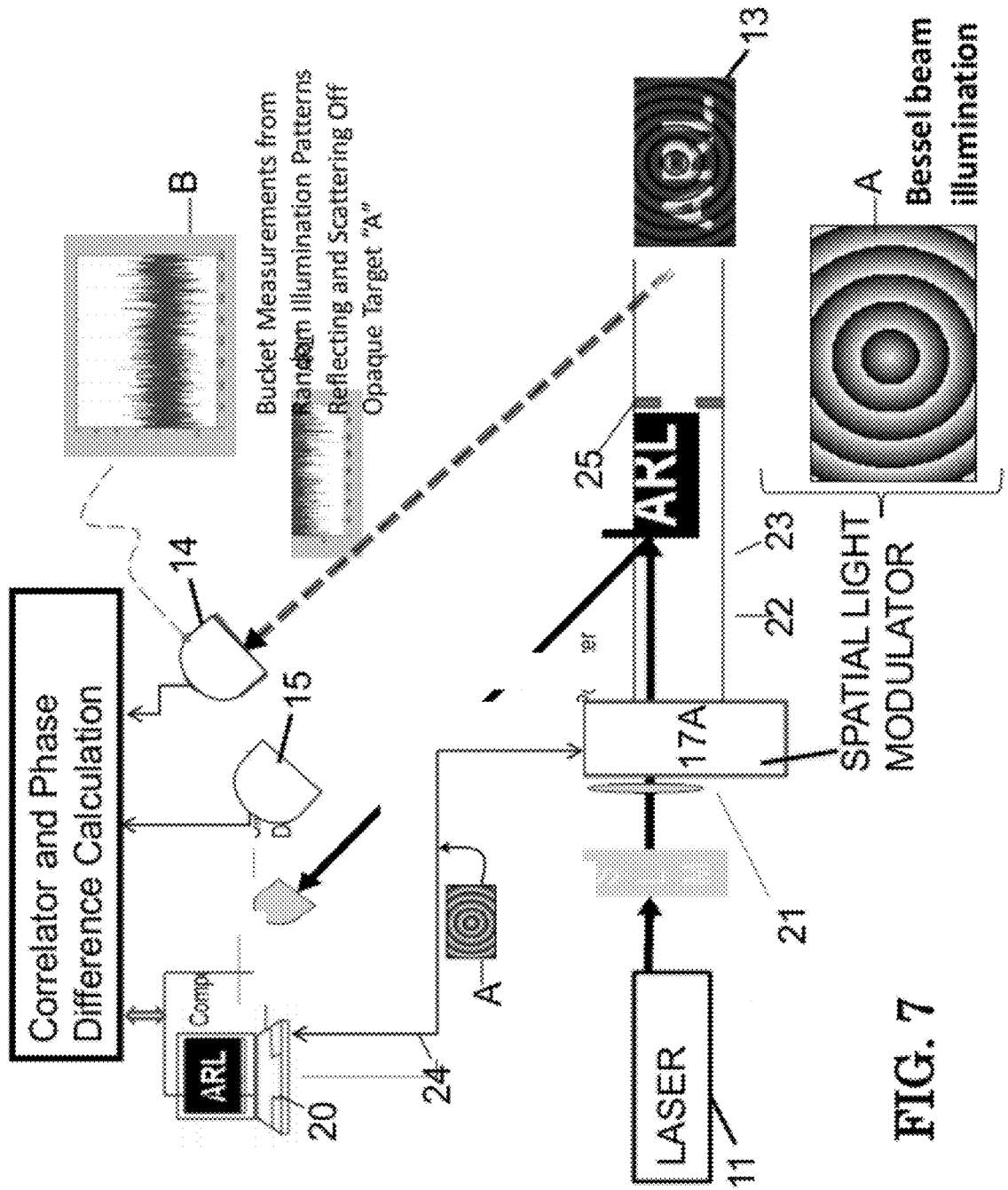
FIG. 7 is schematic system block diagram of a preferred embodiment according to the principles of the present invention comprising, inter alia, a spatial light modulator 17A and an aperture 25. The aperture diameter was 2 mm. The aperture may be 27.8 cm from the SLM and 73.7 cm from the target.

FIG. 7 depicts a preferred embodiment wherein the beam from laser 11 passes through an optional expansion lens 21 into a spatial light modulator 17A. The spatial light modulator forms the Bessel beam illumination pattern depicted in insert A of FIG. 7. This beam pattern is received by computer 20 by means of a path 24 which may be a variety of wireless transmission means or a conductor of electronic signals. The modified light beam optionally passes through a focusing lens 22 and polarizer 23 onto target 13. For ease of understanding exemplary target 13 is has the letters "ARL" shown thereon, but the target may be of any nature or configuration. As depicted in FIG. 7, measurements from the illumination pattern reflected and/or scattered off opaque target 13 are received by detectors 14 and 15. A correlation and phase difference calculation element 16 correlates the detection signals from detectors 14 and 15 to derive the three dimensional target information. Detectors 14 and 15 are at different distances D1 and D2 from the target. Generally speaking, knowing the speed of light and quantum properties of light, three-dimensional information concerning the target 13 is derived. However, in the case shown in FIG. 7, the information transmitted to computer 20 results in the imaging of the "ARL" target 13 on the computer 20. FIG. 7 includes the additional light modulator 25 which causes the represented effect depicted on target element 13 of FIG. 7.

Figure 8:
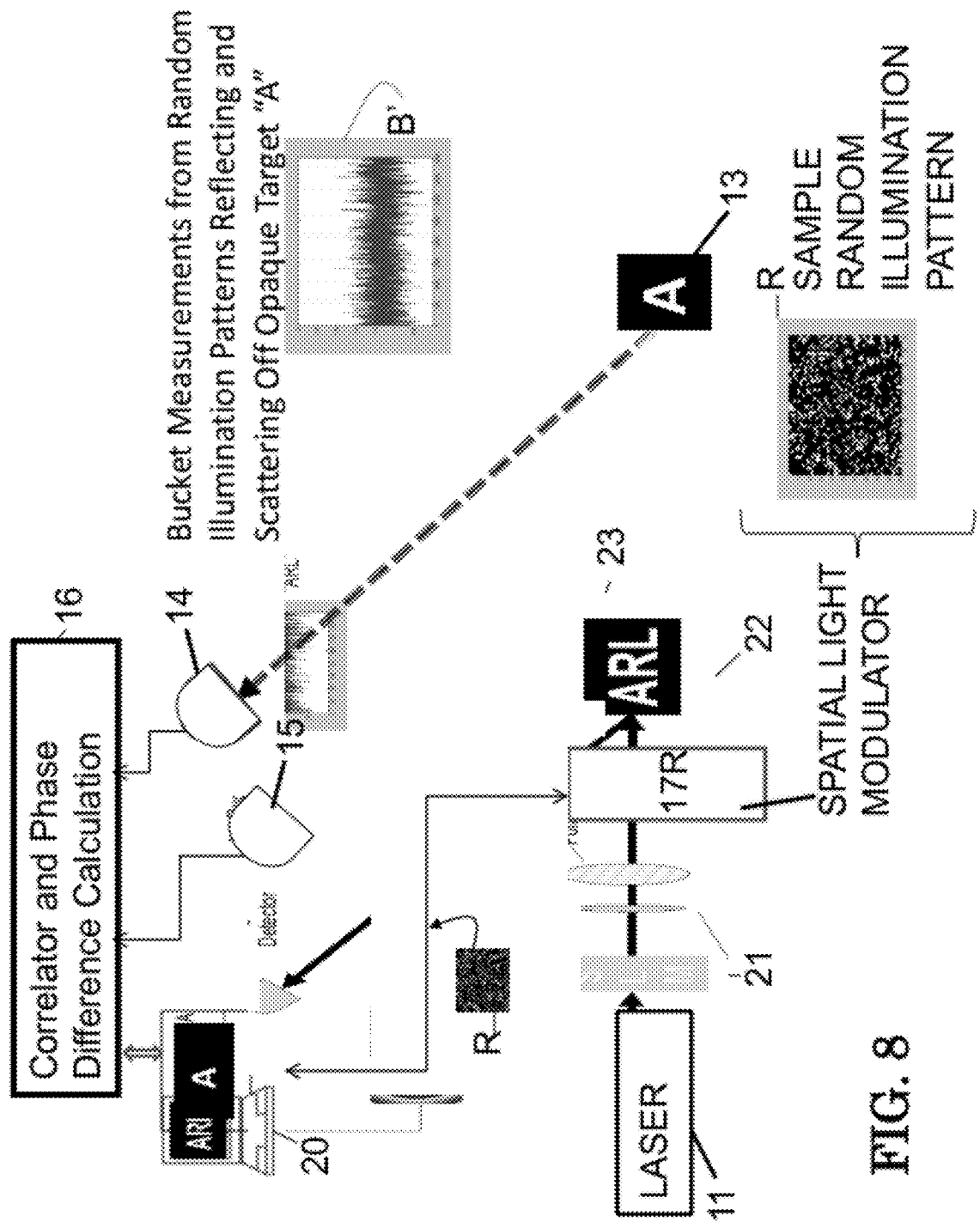
FIG. 8 is schematic system block diagram of a preferred embodiment according to the principles of the present invention comprising, inter alia, a spatial light modulator 17A further illustrating a random illumination pattern.

FIG. 8 depicts a preferred embodiment wherein the beam from laser 11 passes through an optional expansion lens 21 into a spatial light modulator 17A. The spatial light modulator 17R forms the representative random illumination pattern depicted in insert R of FIG. 7. This beam pattern is received by computer 20 by means of a path 24 which may be a variety of wireless transmission means or a conductor of electronic signals. The modified light beam optionally passes through a focusing lens 22 and polarizer 23 onto target 13. For ease of understanding exemplary target 13 is has the letters "A" shown thereon, but the target may be of any nature or configuration. As depicted in FIG. 8, measurements from the illumination pattern reflected and/or scattered off opaque target 13 are received by detectors 14 and 15. A correlation and phase difference calculation element 16 correlates the detection signals from detectors 14 and 15 to derive the 3-D target information. Detectors 14 and 15 are at different distances D1 and D2 from the target. Generally speaking, knowing the speed of light and quantum properties of light, three-dimensional information concerning the target 13 is derived. However, in the case shown in FIG. 8, the information transmitted to computer 20 results in the imaging of the "A" target 13 on the computer 20. FIG. 8 may include the additional light modulator 25 (not shown).

In each of the embodiments discussed herein, the laser 11 may be, for example, a 1.55-μm semiconductor laser diode operating at 1-mW average power modulated 2-mW peak-to-peak. Although only two receivers or detectors 14 and 15 are depicted, the receiver electronics may encompass a single pair of detectors or a linear array of, for example, 32 detectors. The laser beam emitted from the semiconductor laser 11 may be collected and focused to project a beam sufficiently wide to encompass or flood illuminate the downrange target and be reflected into a linear detector array, or for a single pixel, focused to a small spot and aligned to intersect with the detector field of view (FOV). A portion of the laser beam is reflected from the target 13, and collected by the receivers/detectors 14, 15. The detectors 14 and 15 may be a pair of detectors such as metal-semiconductor-metal Schottky photodiode (MSM-PD) OEM detectors. As shown schematically in FIG. When the transmitter modulation waveform (LO voltage) is applied to the detectors, a photocurrent response is recovered at each detector that is the product or mixing of the LO and the modulated light waveforms.

Figure 9:
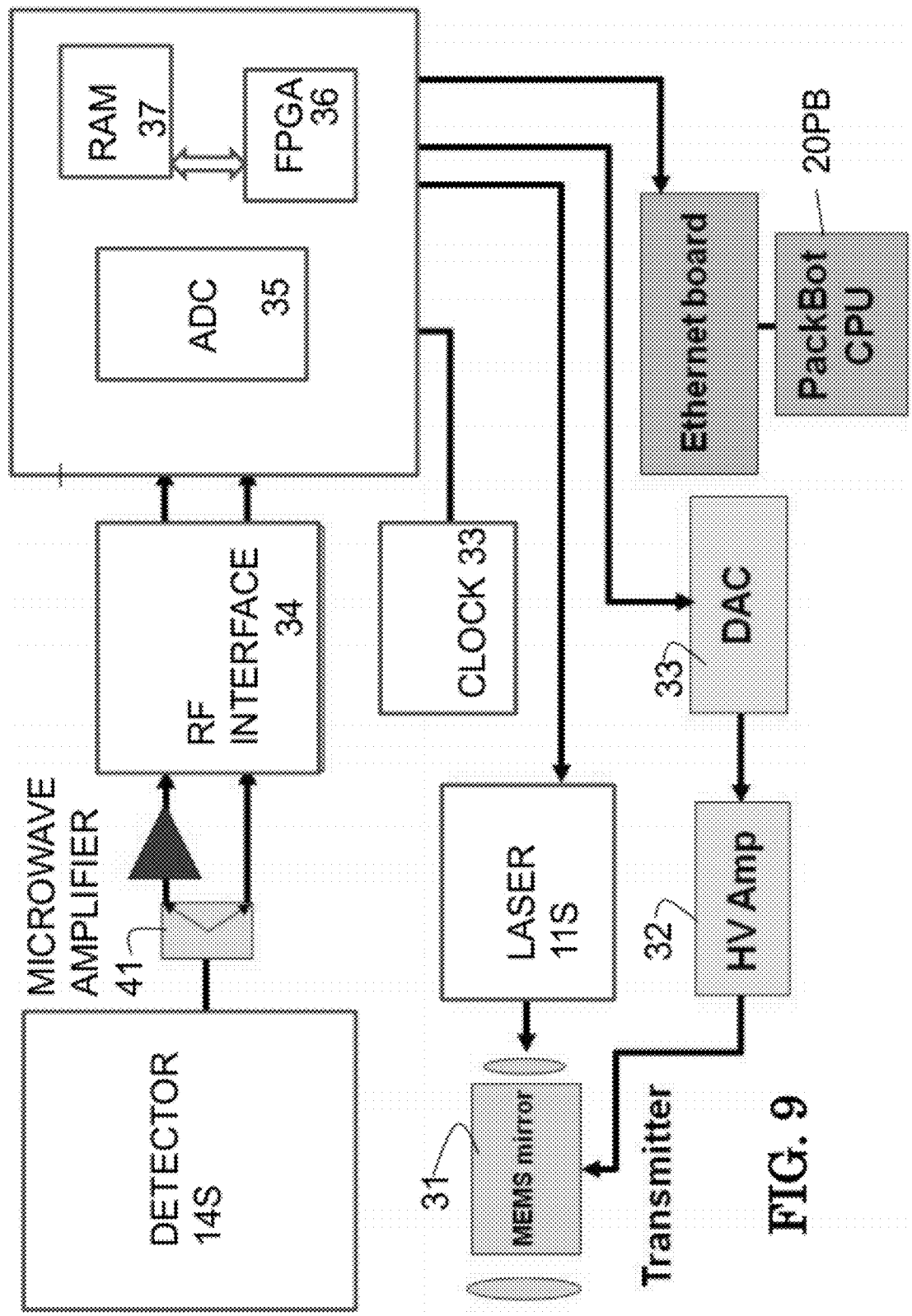
FIG. 9 is schematic system block diagram of showing ladar components.
Figure 10:
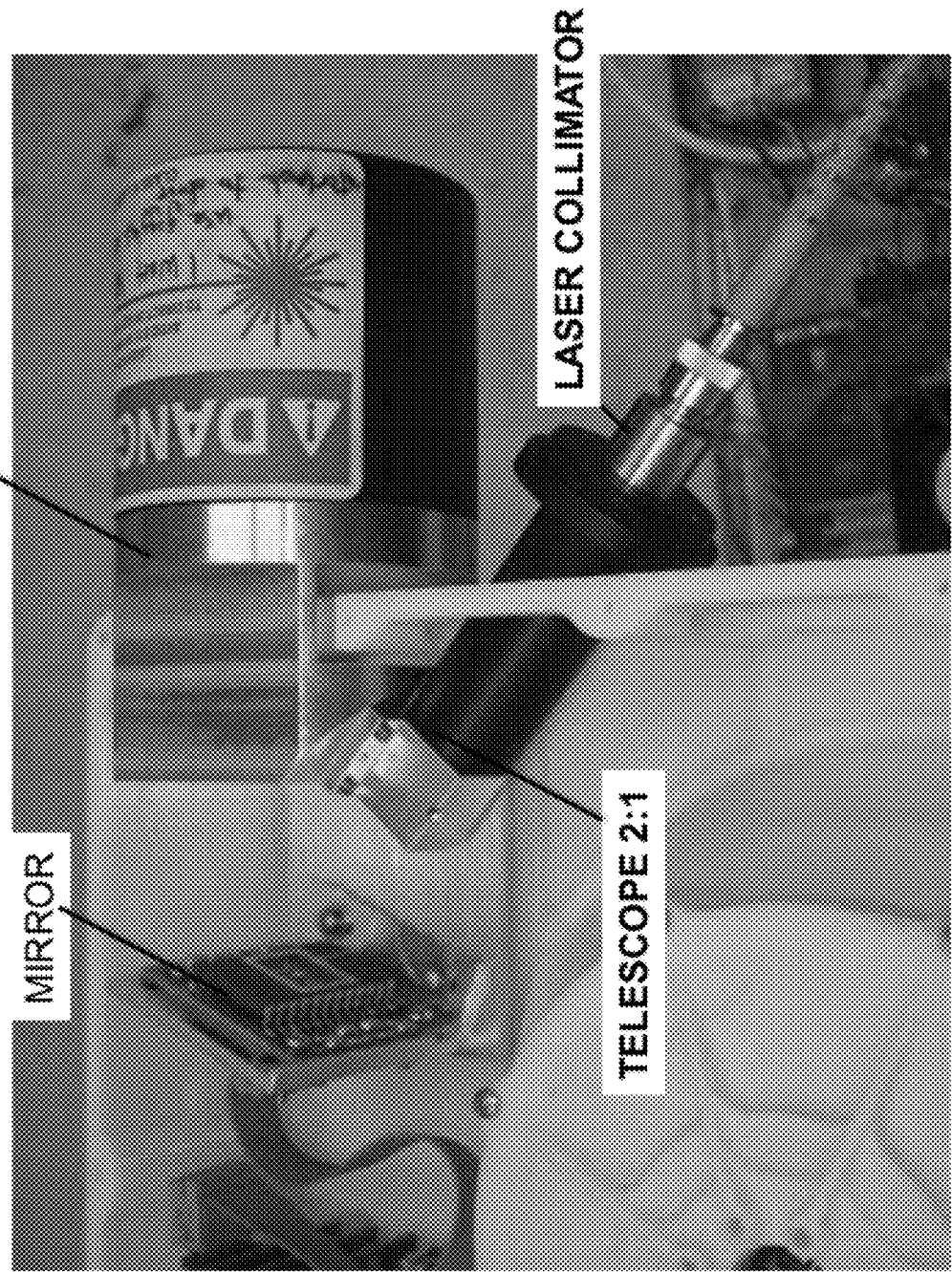
FIG. 10 is an illustration of a partial ladar showing ladar components.
Figure 11:
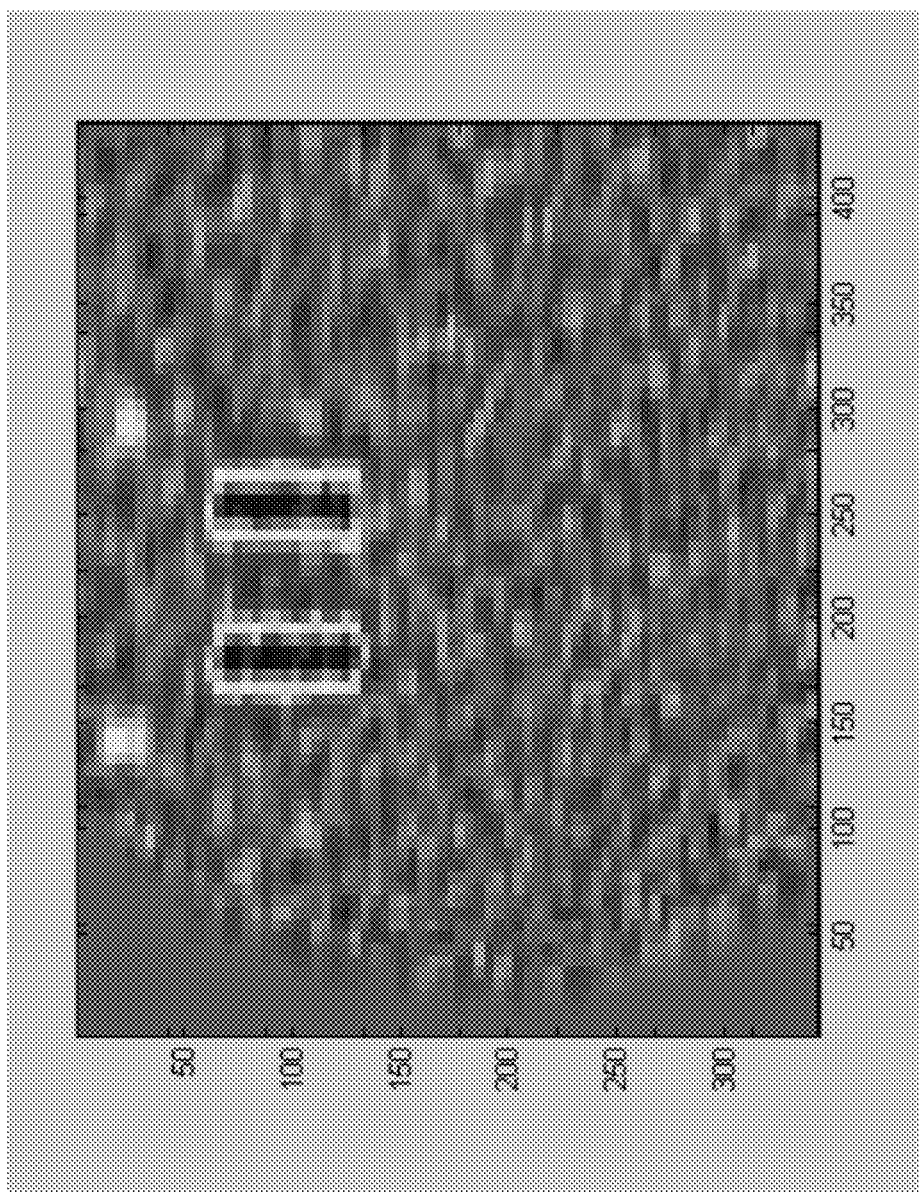
FIG. 11 is an illustration of an image constructed using a simulation showing a rendition of a plane integrated through a distance 1.
Figure 12:
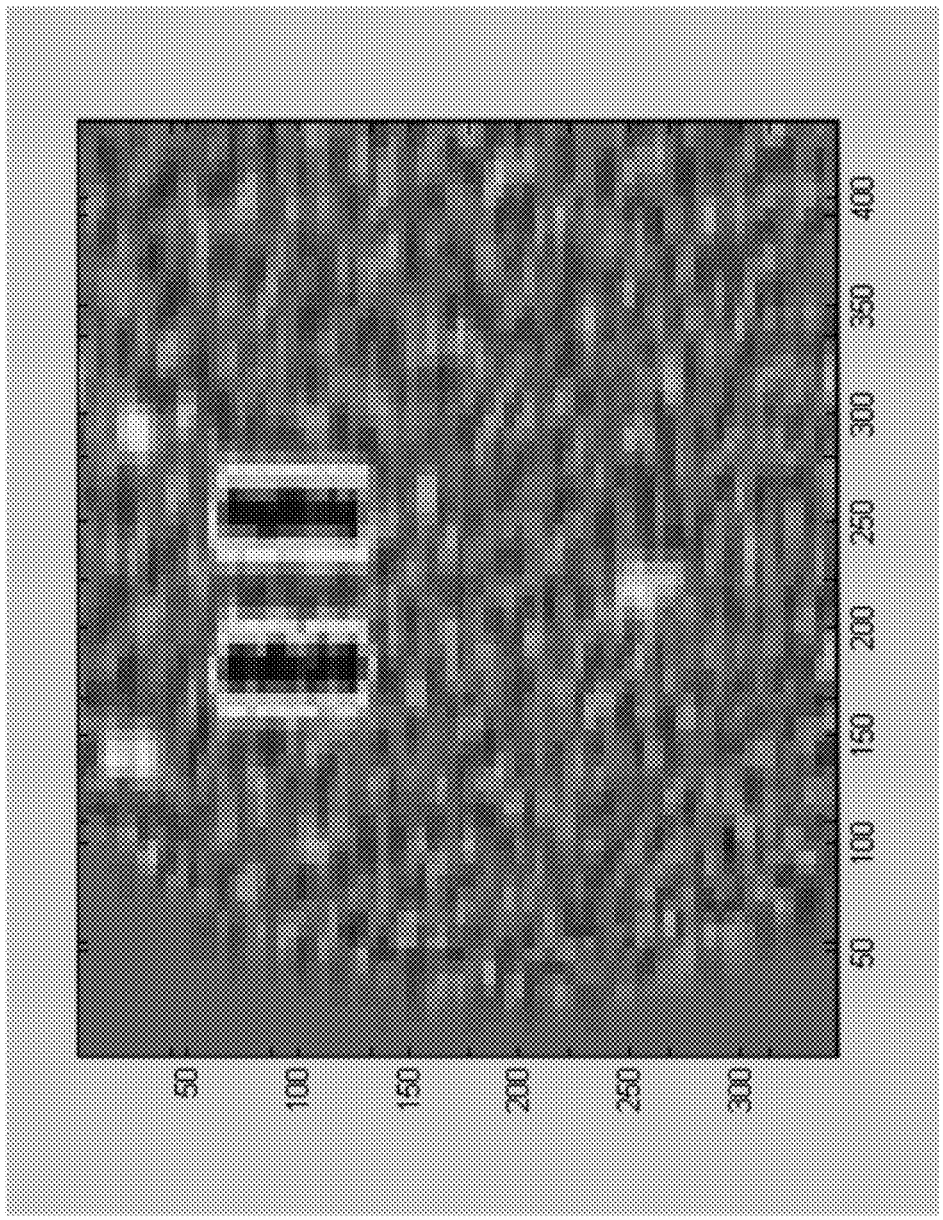
FIG. 12 is an illustration of an image constructed using a simulation showing a rendition of a plane integrated through a distance 2.
Figure 13:
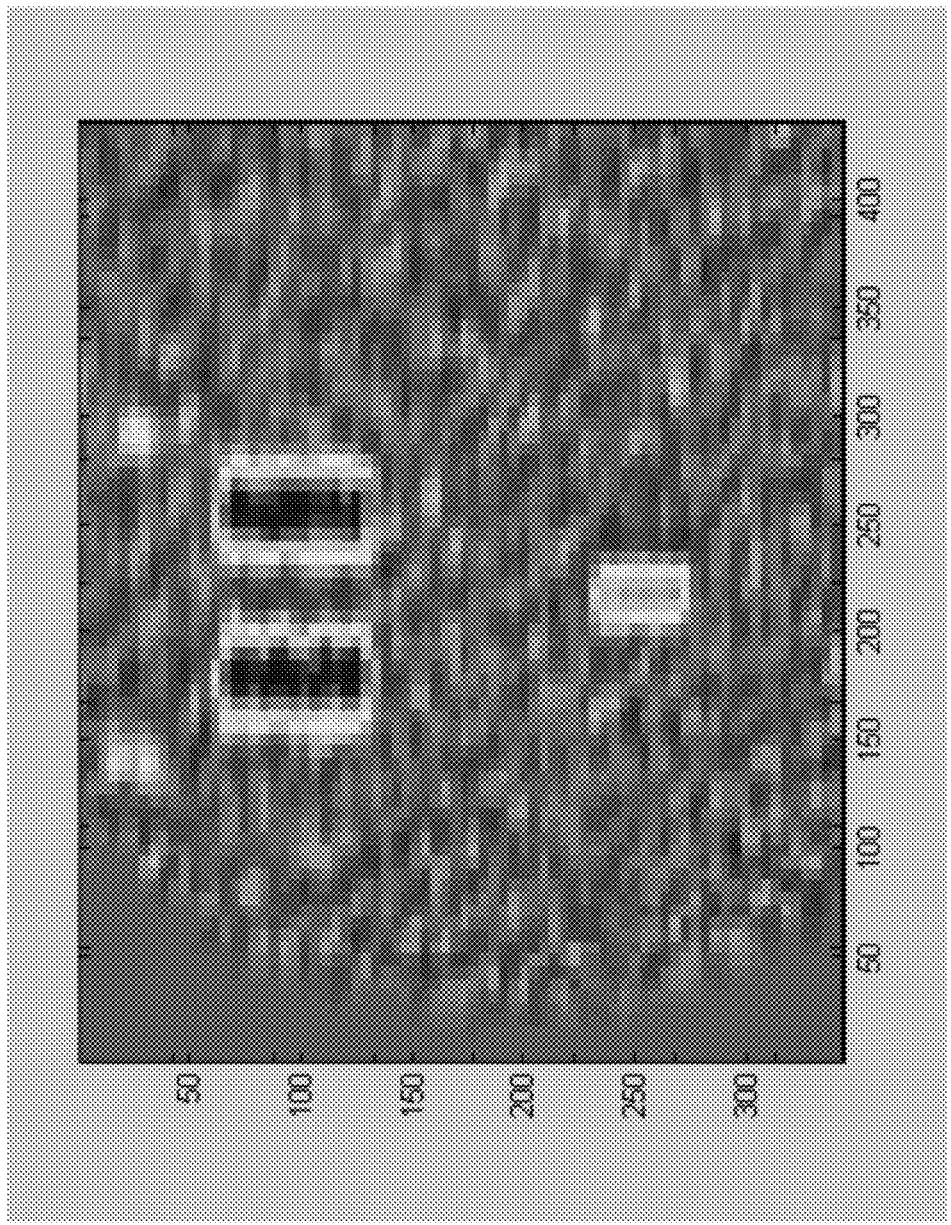
FIG. 13 is an illustration of an image constructed using a simulation showing a rendition of a plane integrated through a distance 3.
Figure 14:
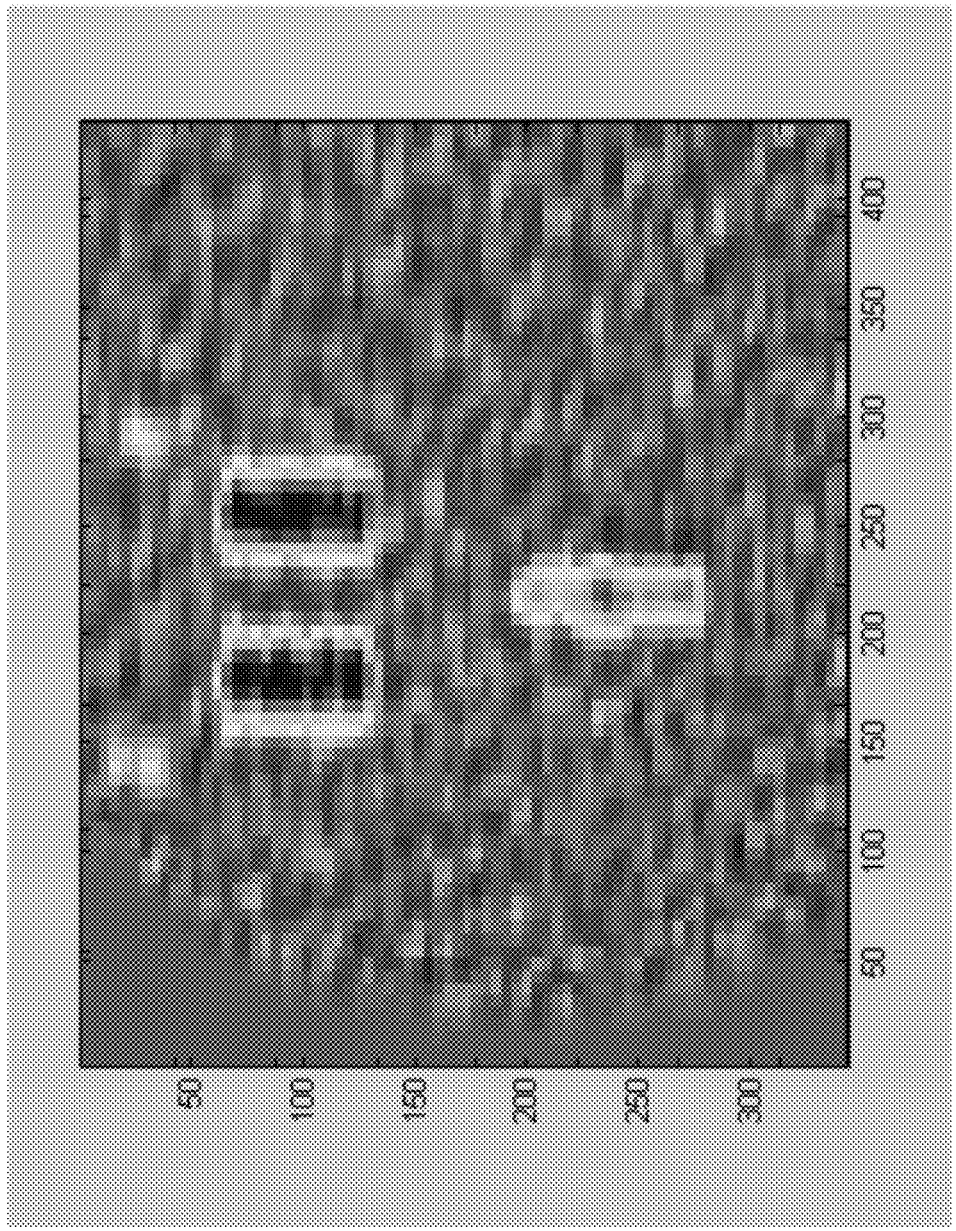
FIG. 14 is an illustration of an image constructed using a simulation showing a rendition of a plane integrated through a distance 4.
Figure 15:
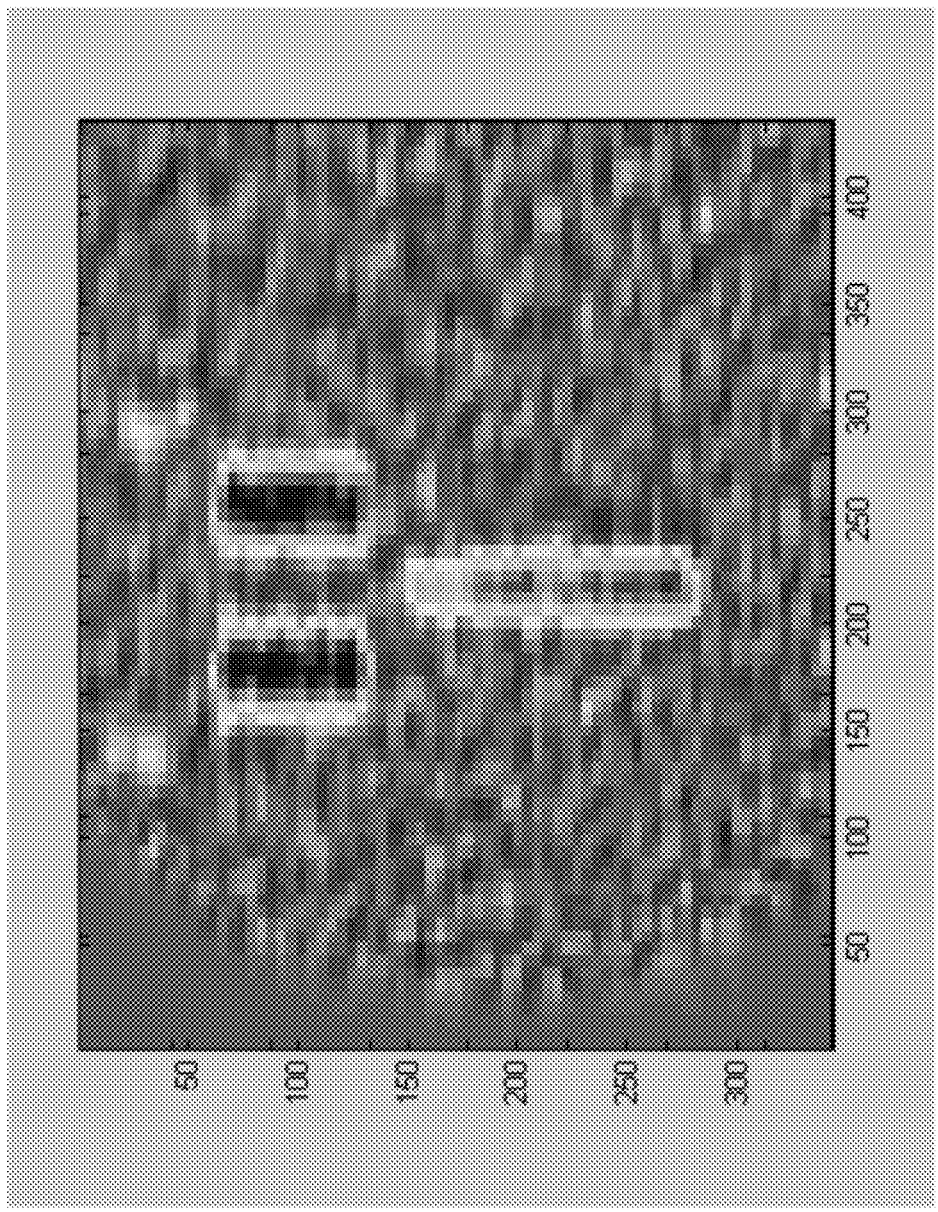
FIG. 15 is an illustration of an image constructed using a simulation showing a rendition of a plane integrated through a distance 5.
Figure 16:
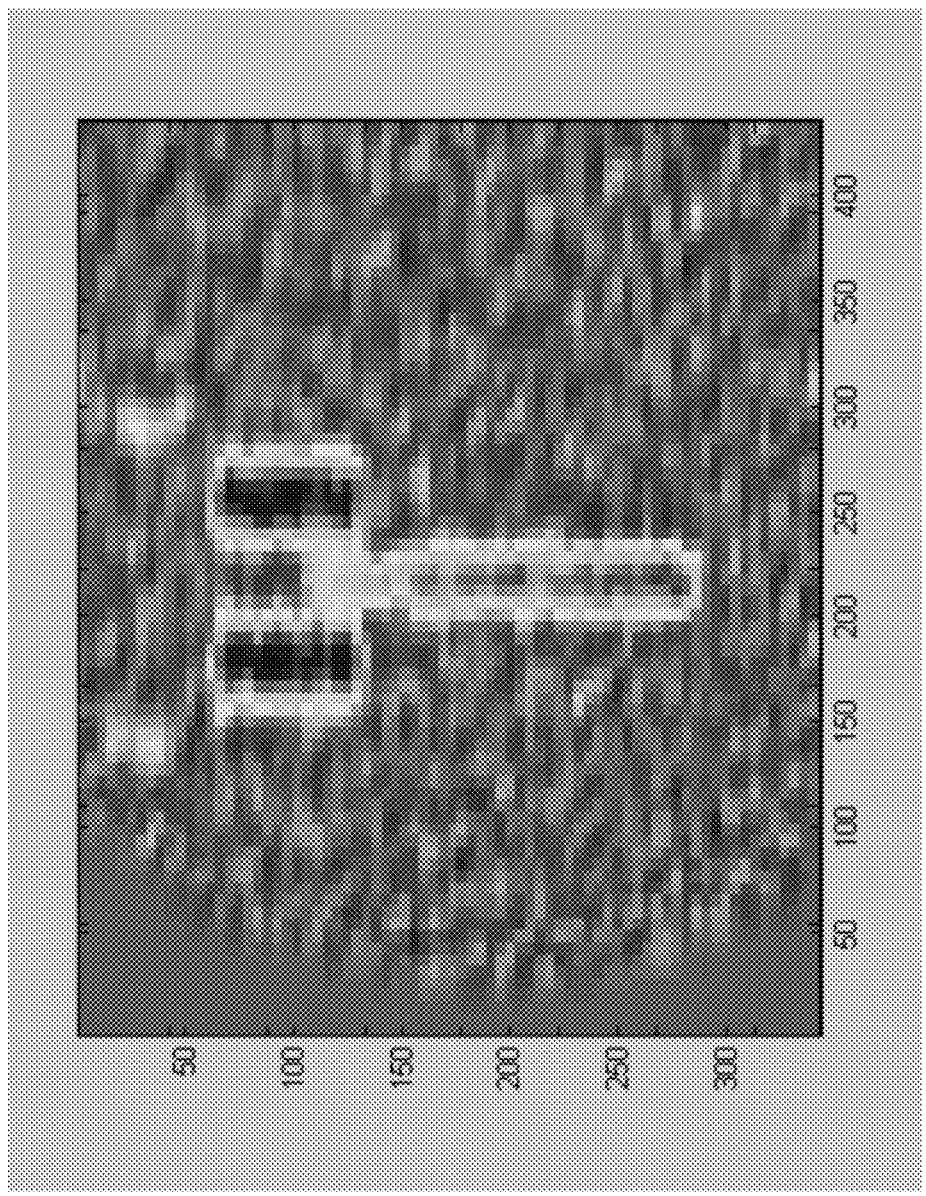
FIG. 16 is an illustration of an image constructed using a simulation showing a rendition of a plane integrated through a distance 6.
Figure 17:
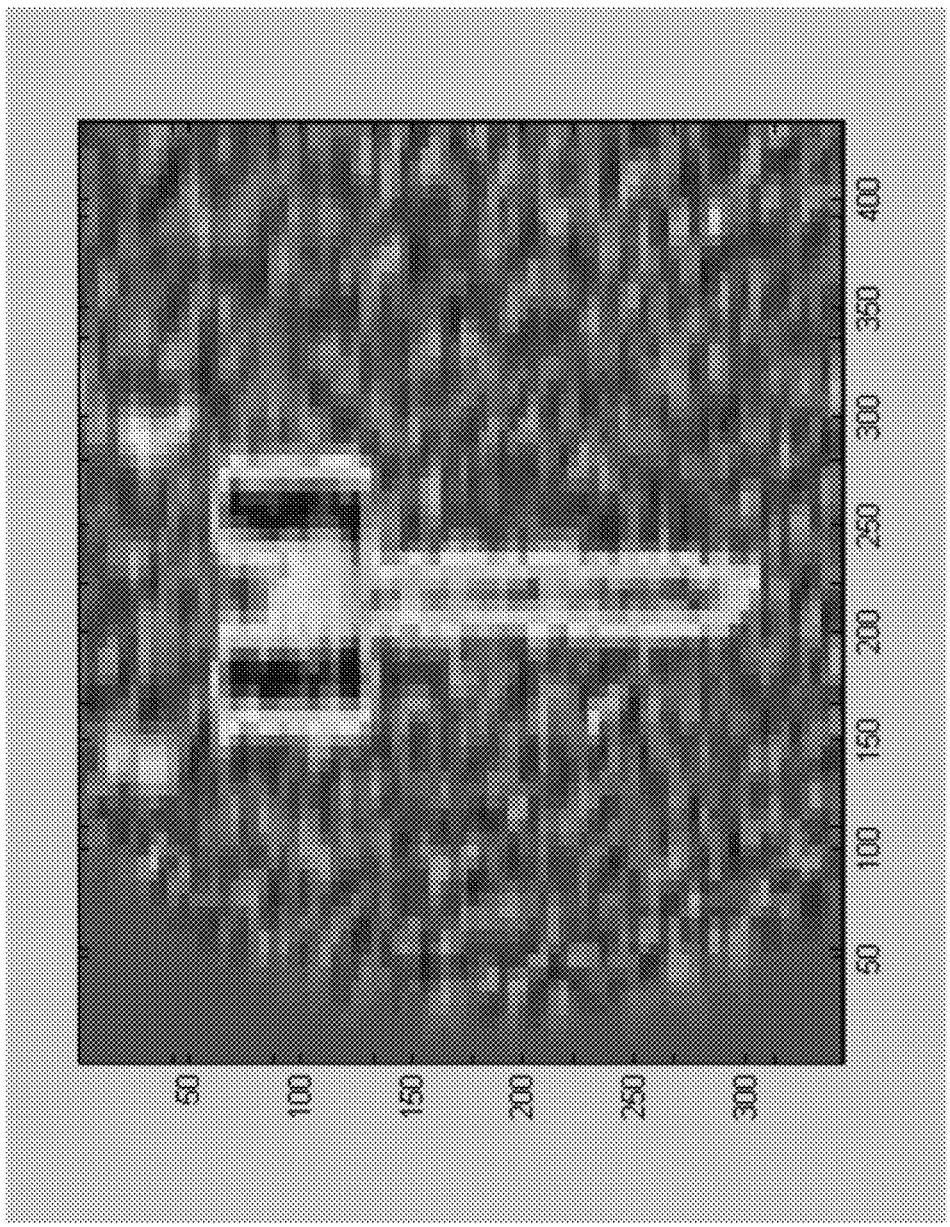
FIG. 17 is an illustration of an image constructed using a simulation showing a rendition of a plane integrated through a distance 7.
Figure 18:
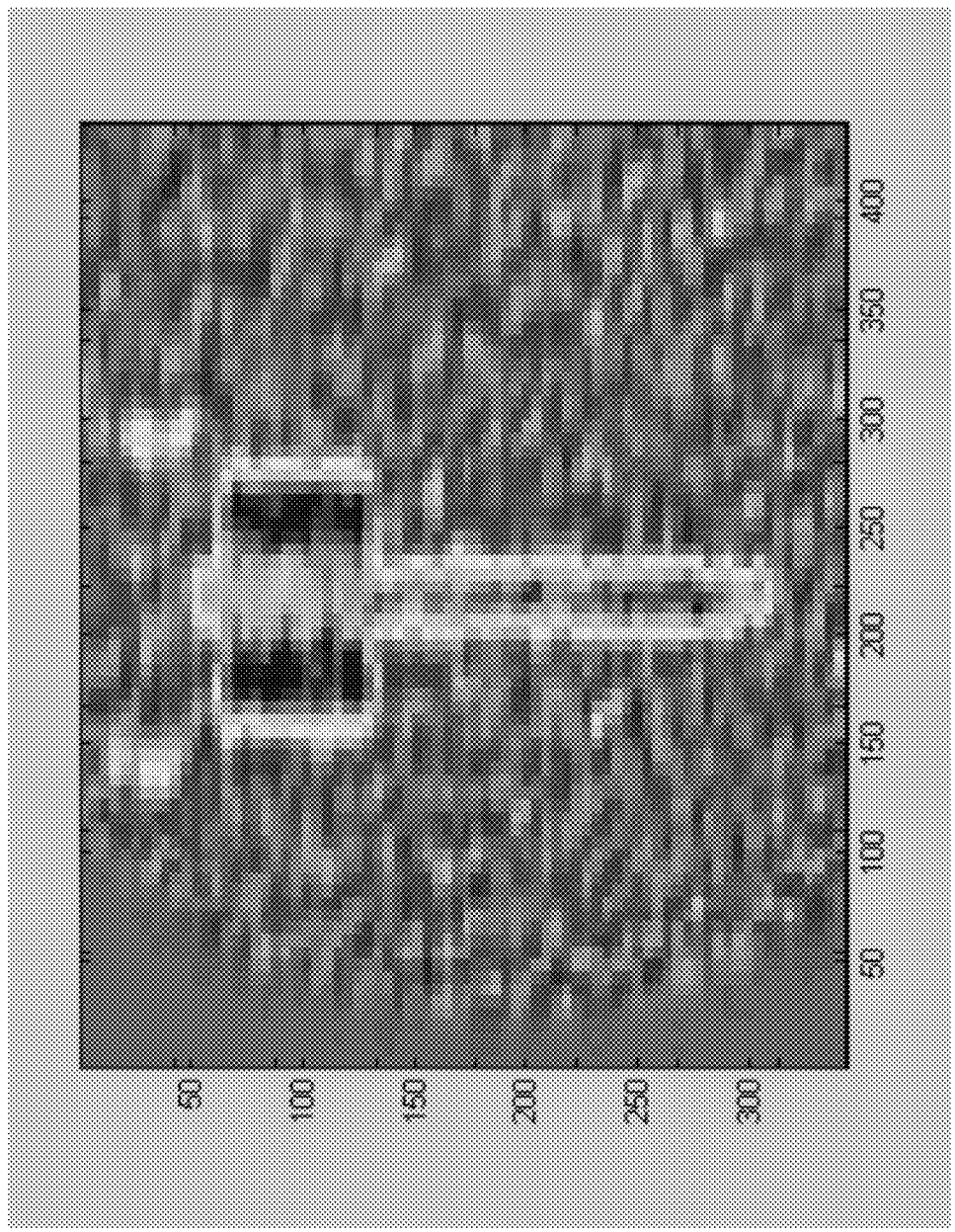
FIG. 18 is an illustration of an image constructed using a simulation showing a rendition of a plane integrated through a distance 8.
Figure 19:
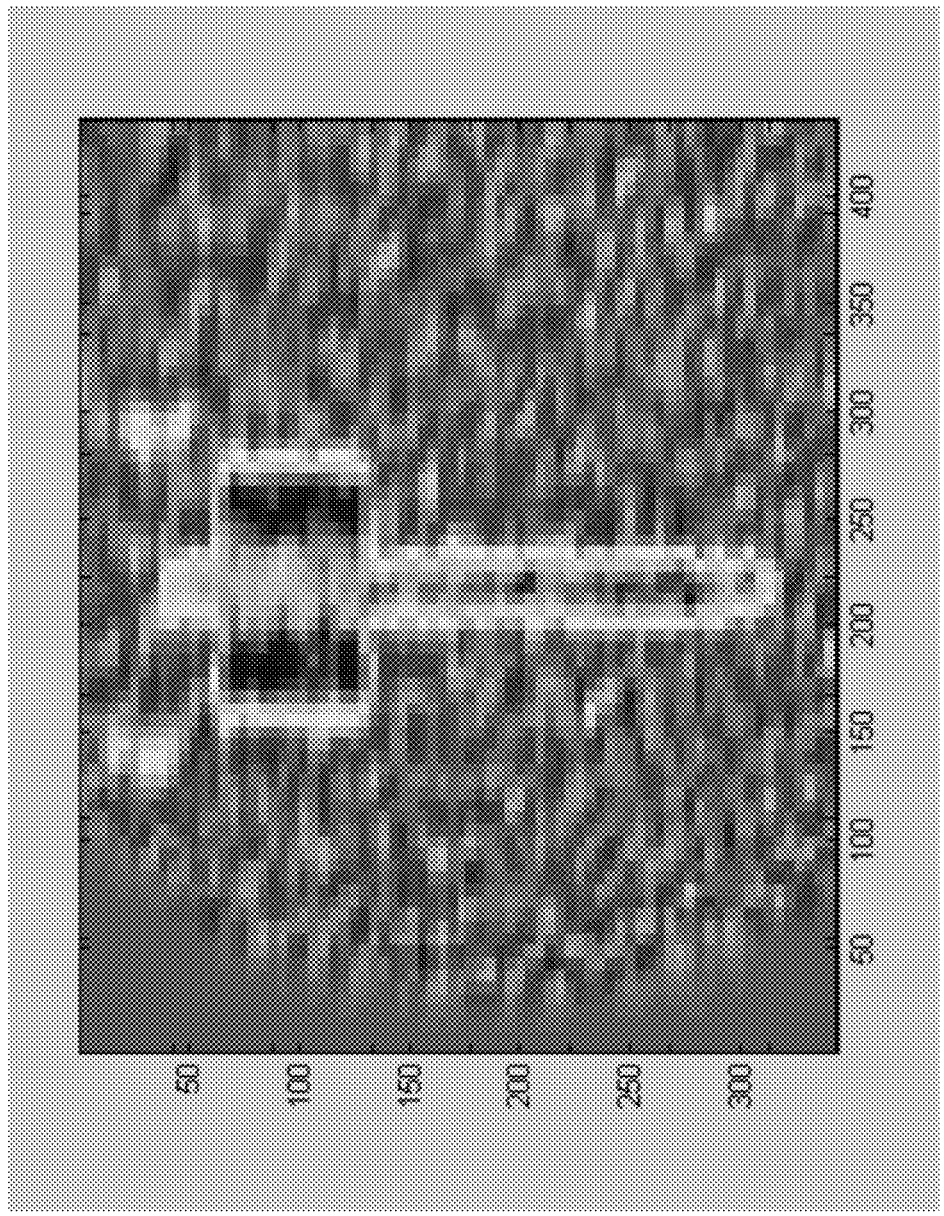
FIG. 19 is an illustration of an image constructed using a simulation showing a rendition of a plane integrated through a distance 9.
Figure 20:
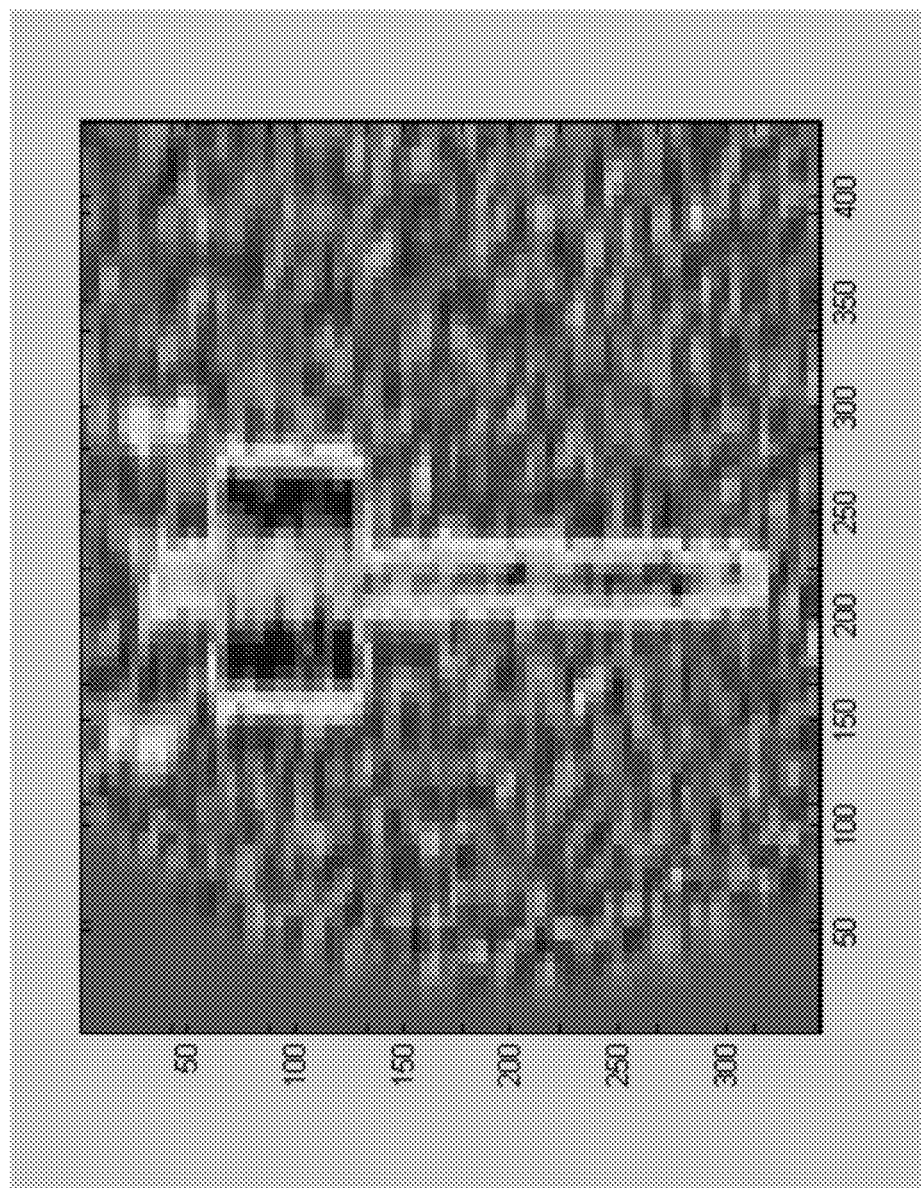
FIG. 20 is an illustration of an image constructed using a simulation showing a rendition of a plane integrated through a distance 10.
Figure 21:
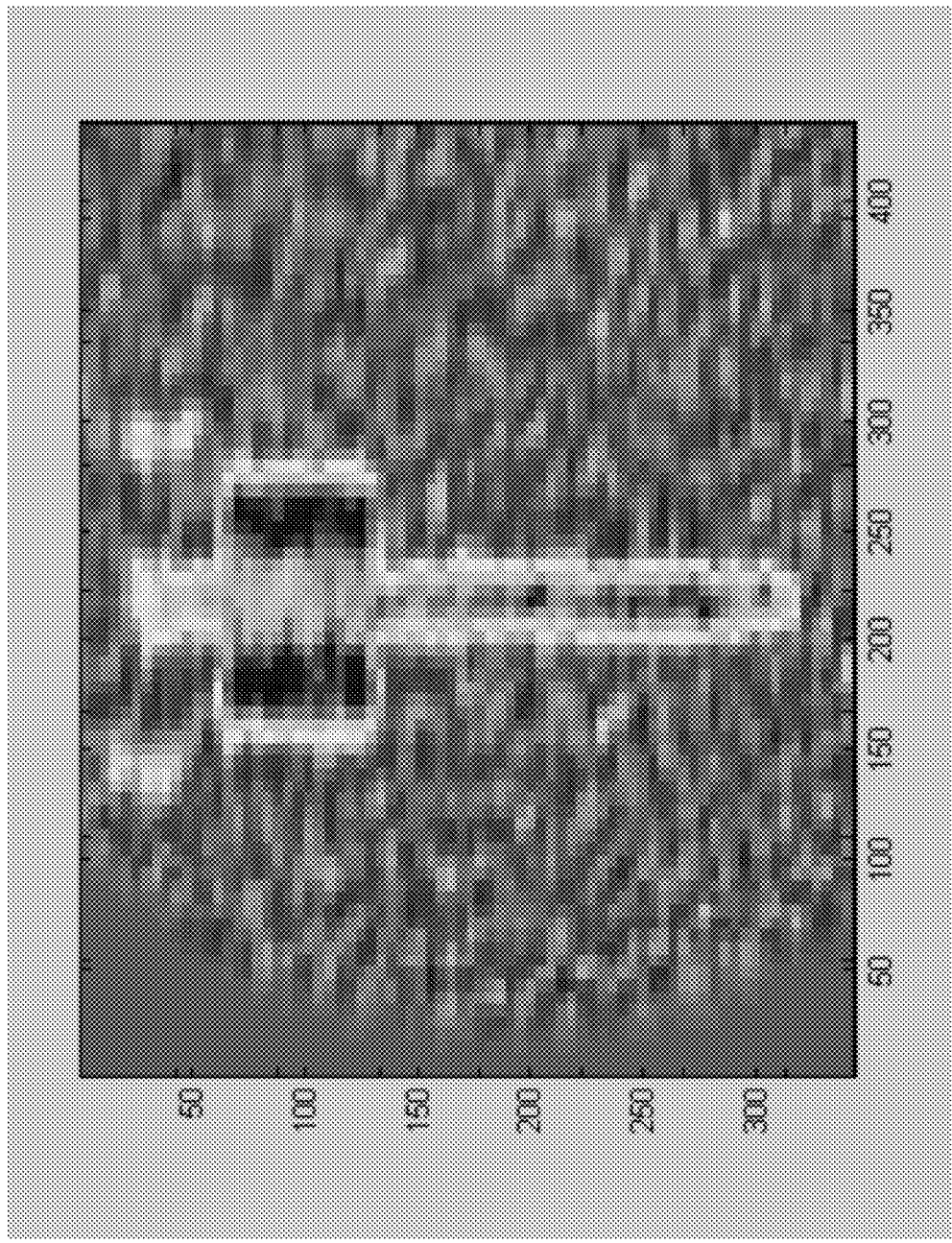
FIG. 21 is an illustration of an image constructed using a simulation showing a rendition of a plane integrated through a distance 11.
Figure 22:
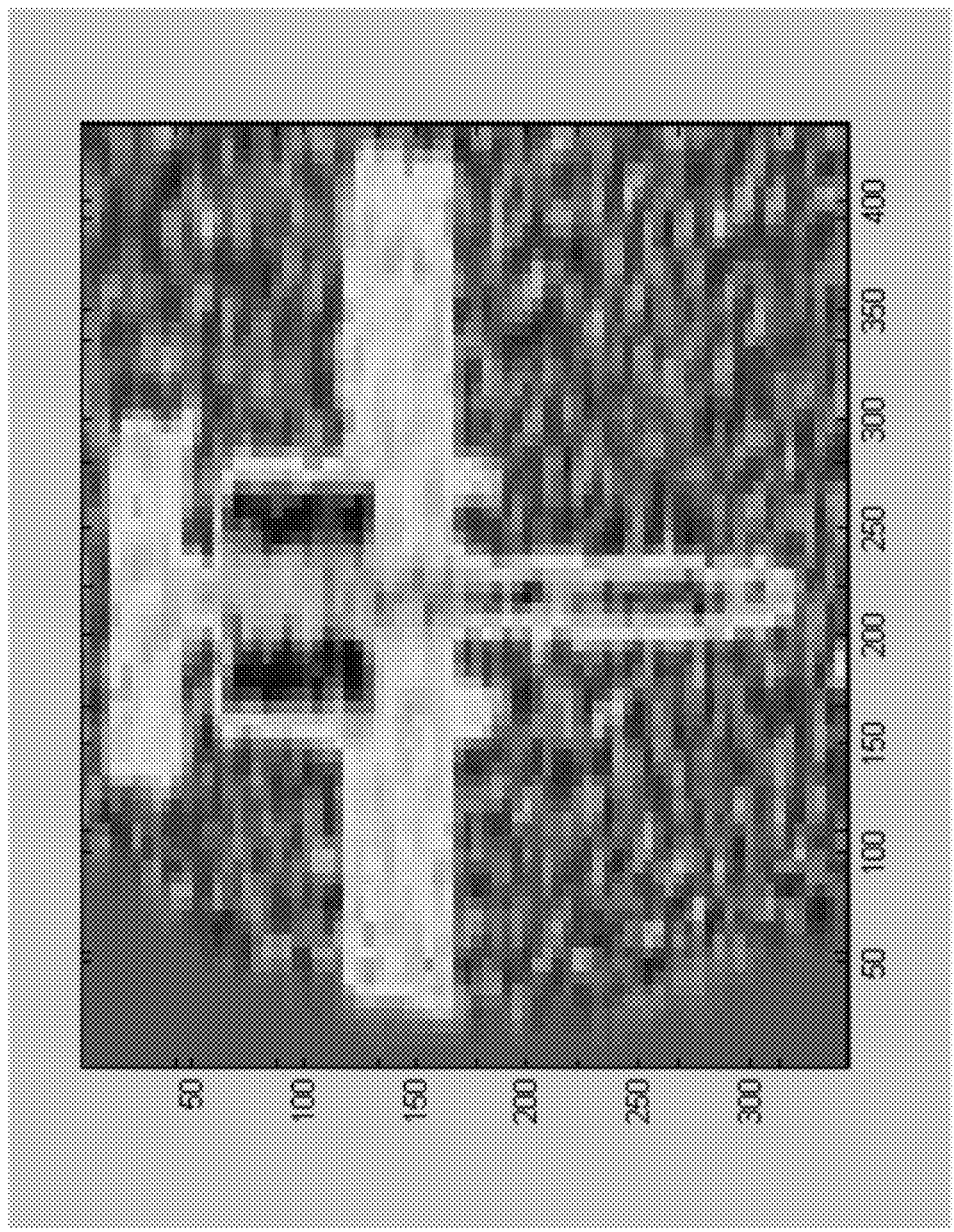
FIG. 22 is an illustration of an image constructed using a simulation showing a rendition of a plane integrated through a distance 12.
Figure 23:
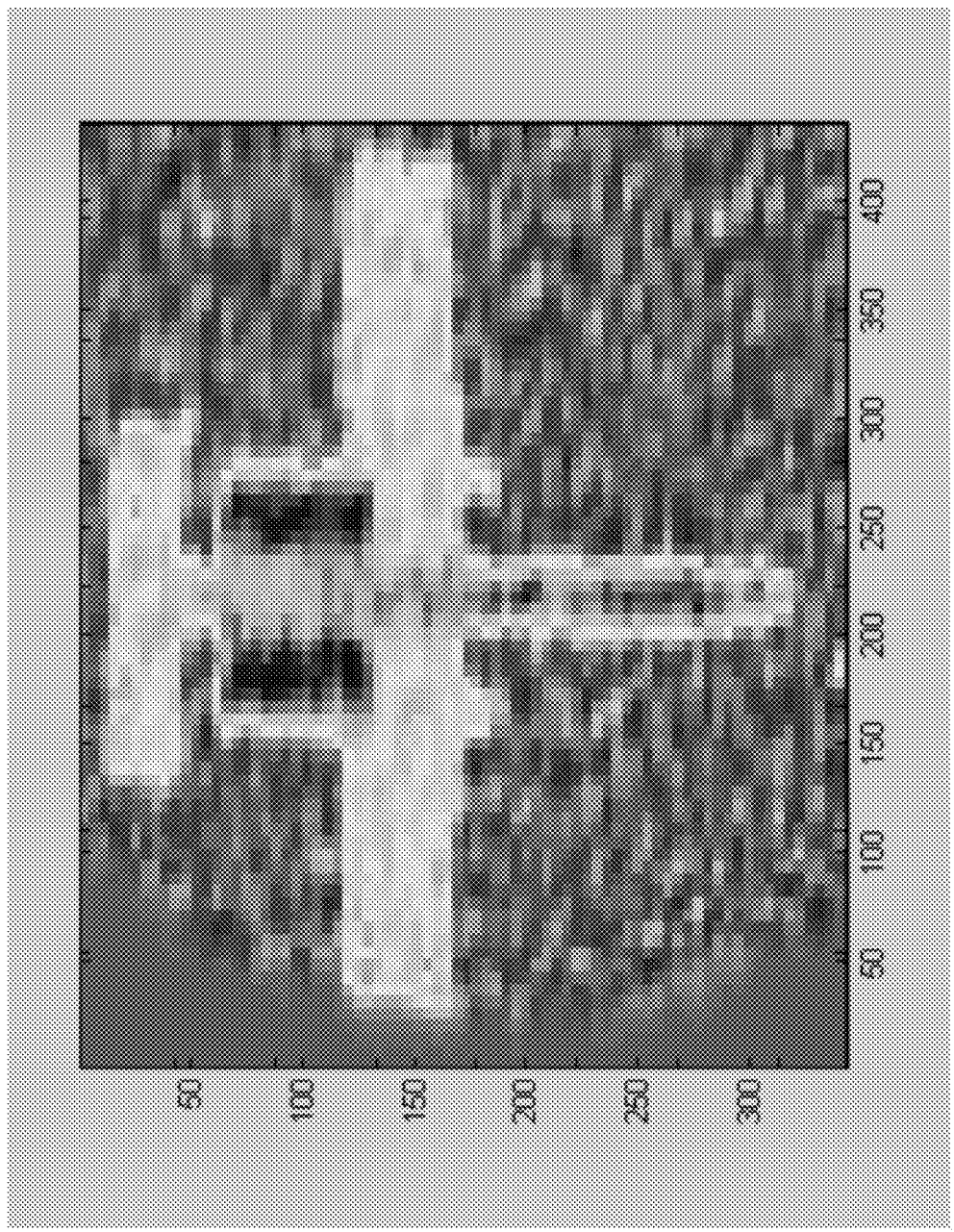
FIG. 23 is an illustration of an image constructed using a simulation showing a rendition of a plane integrated through a distance 13.
Figure 24:
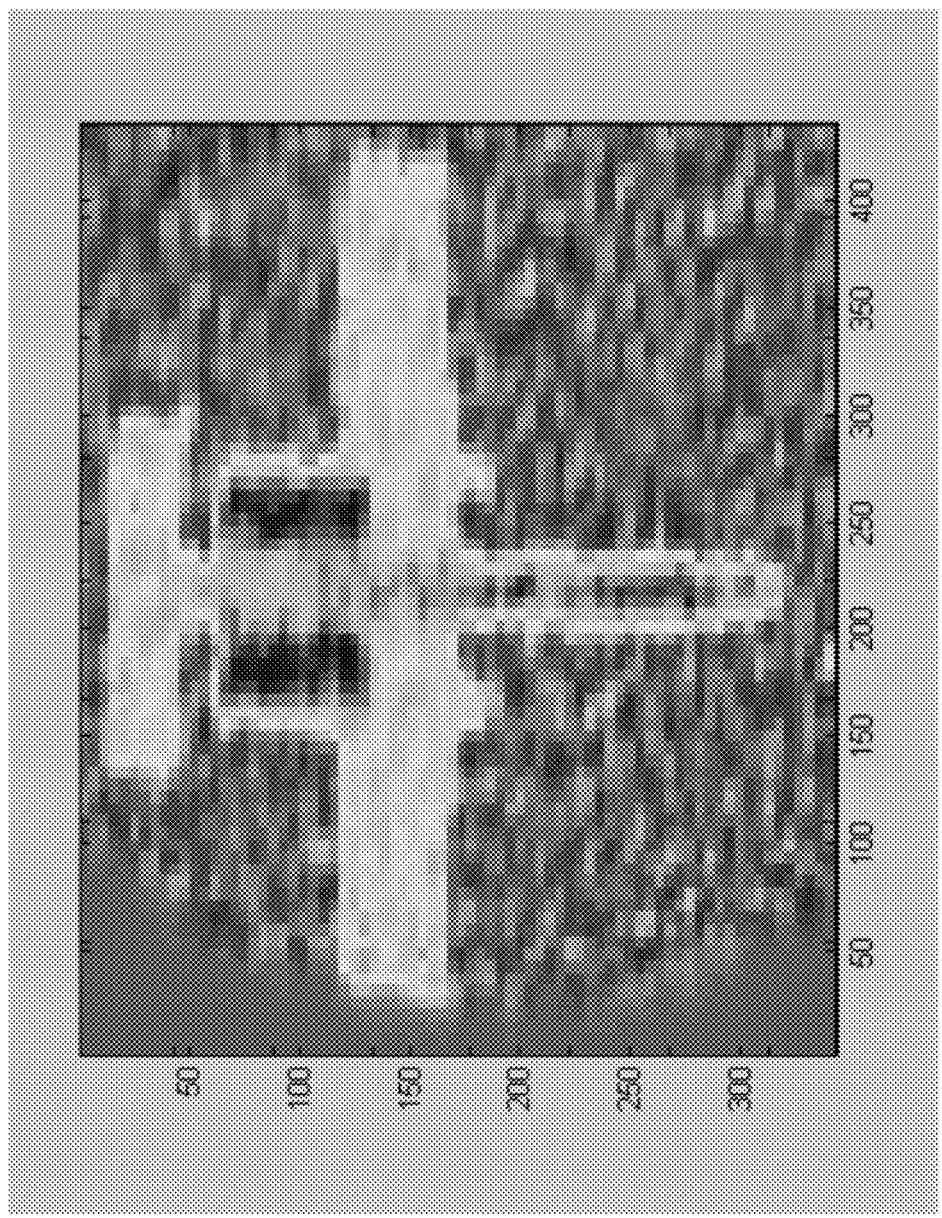
FIG. 24 is an illustration of an image constructed using a simulation showing a rendition of a plane integrated through a distance 14.
Figure 25:
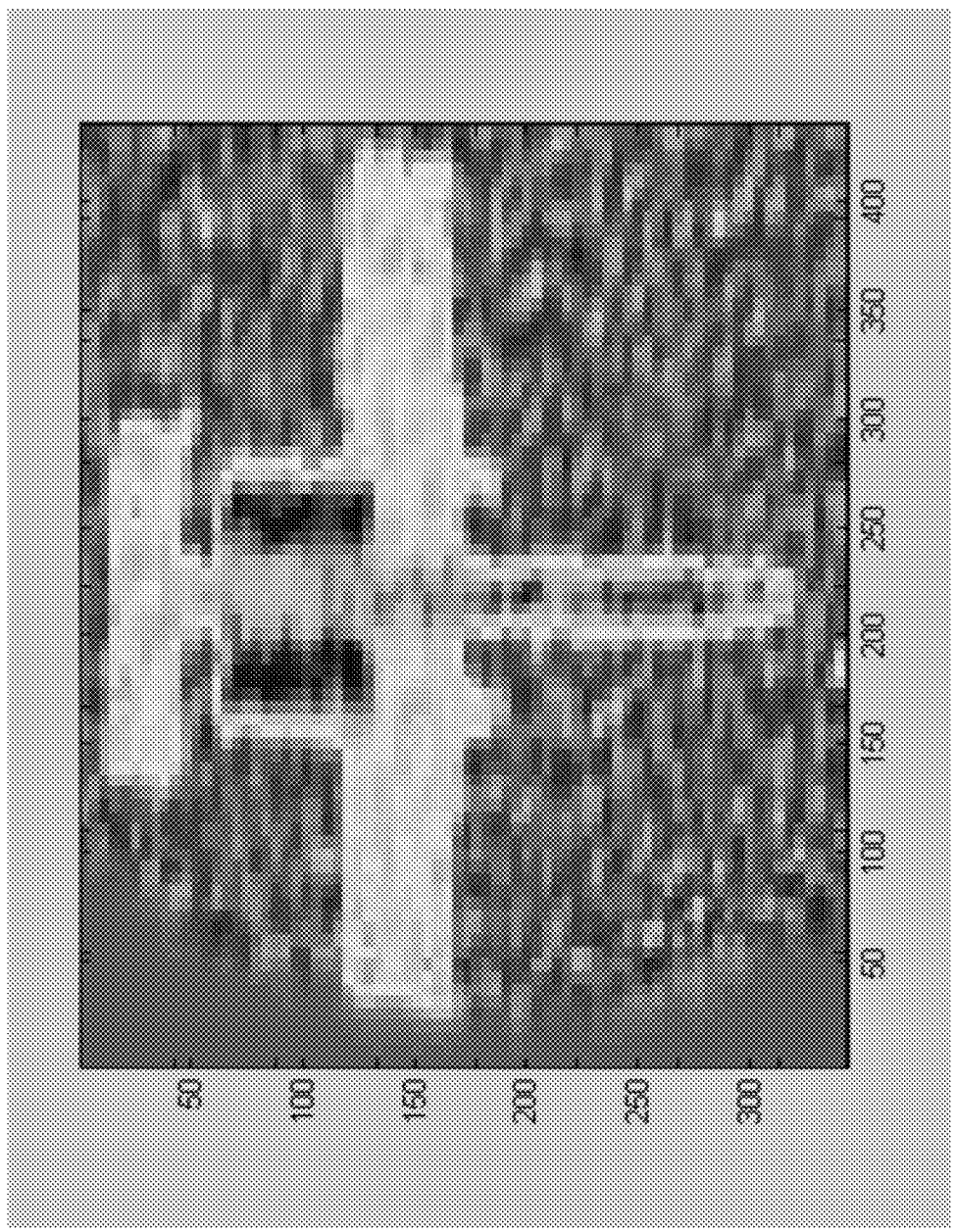
FIG. 25 is an illustration of an image constructed using a simulation showing a rendition of a plane integrated through a distance 15.
Figure 26:
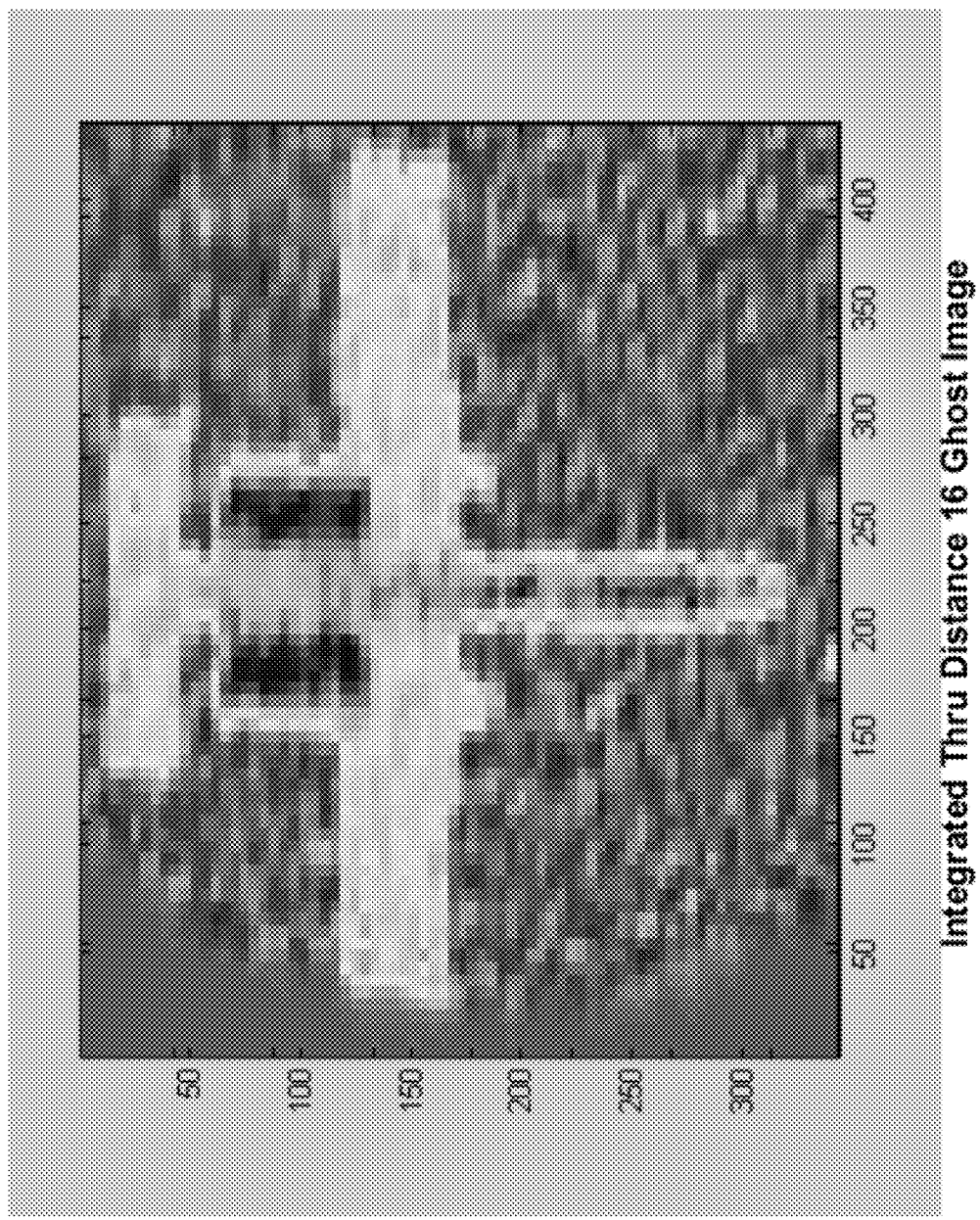
FIG. 26 is an illustration of an image constructed using a simulation showing a rendition of a plane integrated through a distance 16.
Figure 27:
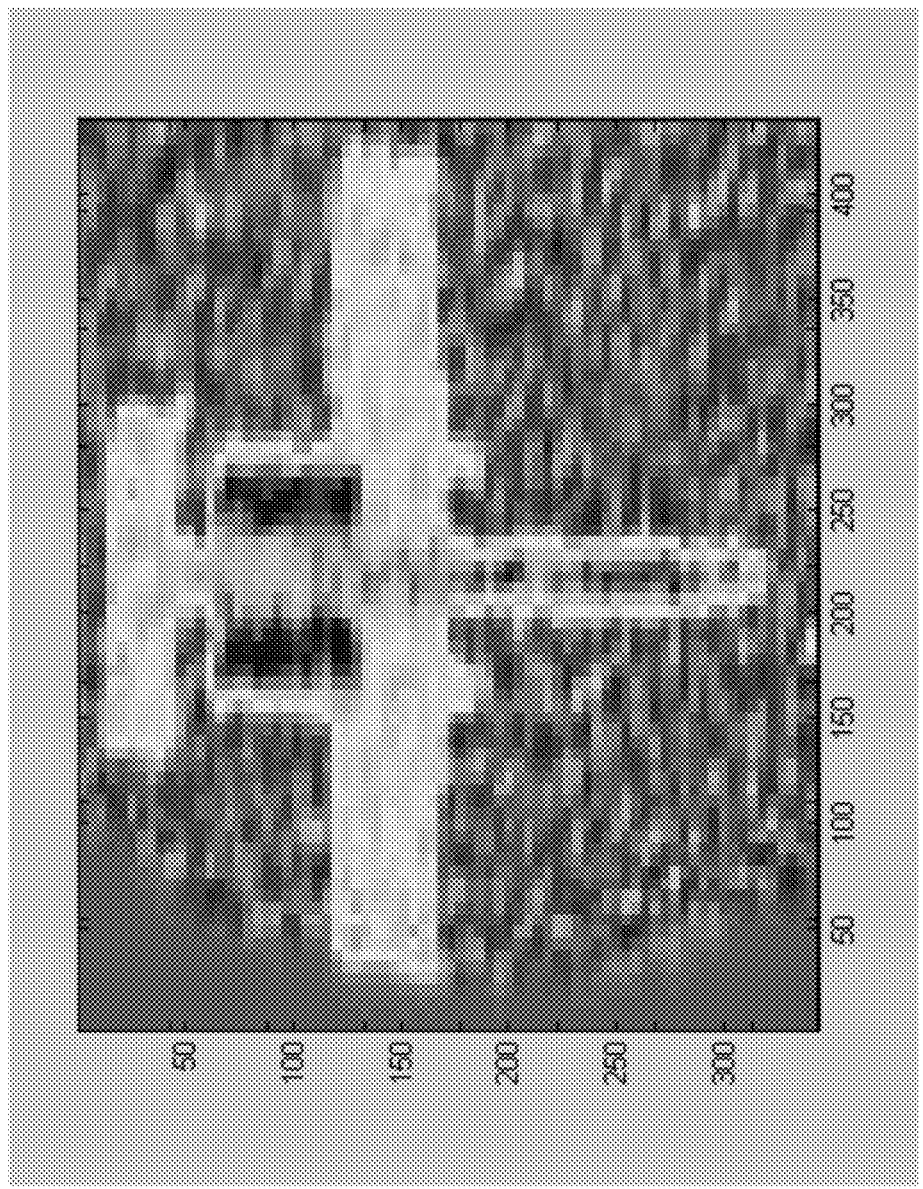
FIG. 27 is an illustration of an image constructed using a simulation showing a rendition of a plane integrated through a distance 17.
Figure 28:
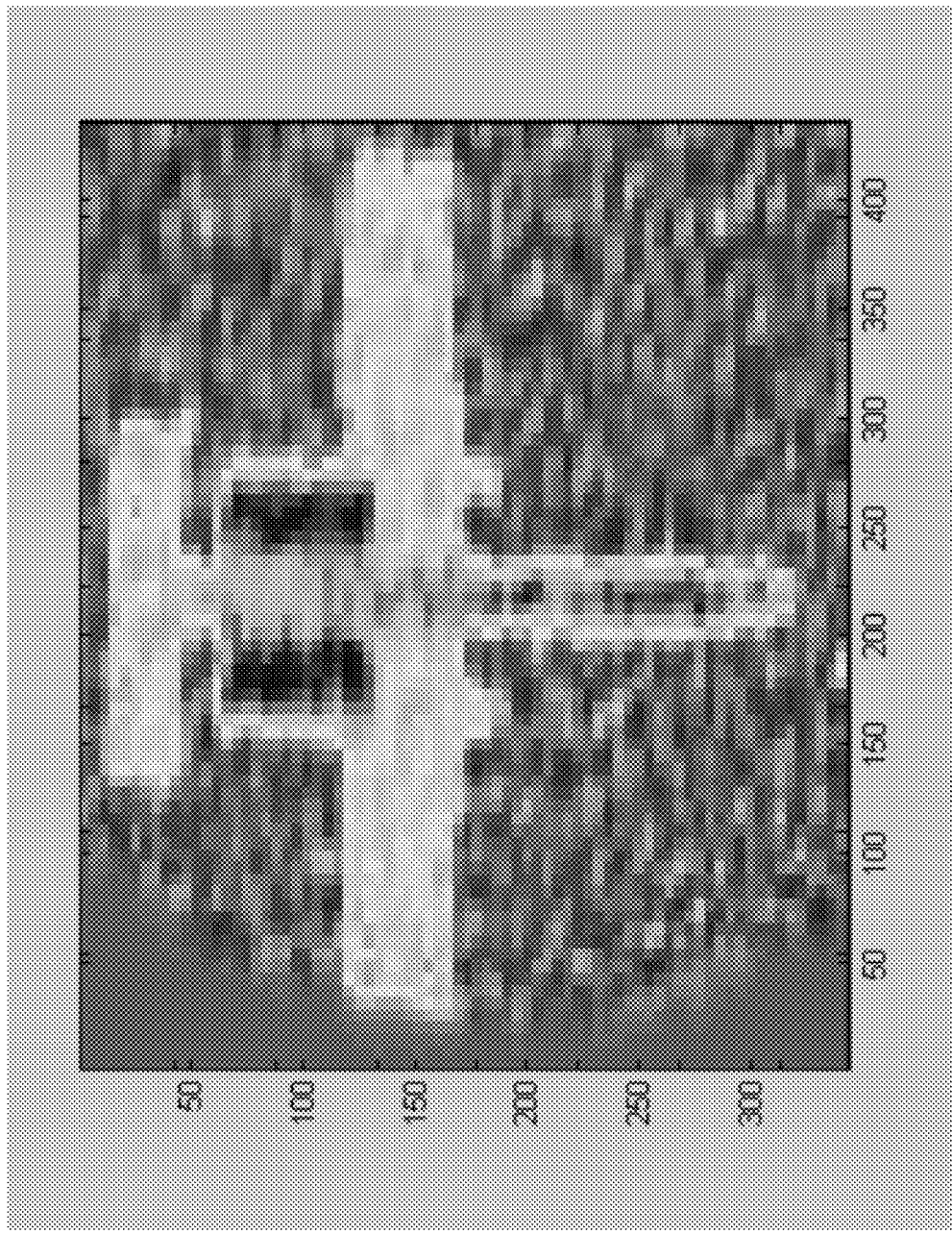
FIG. 28 is an illustration of an image constructed using a simulation showing a rendition of a plane integrated through a distance 18.
Figure 29:
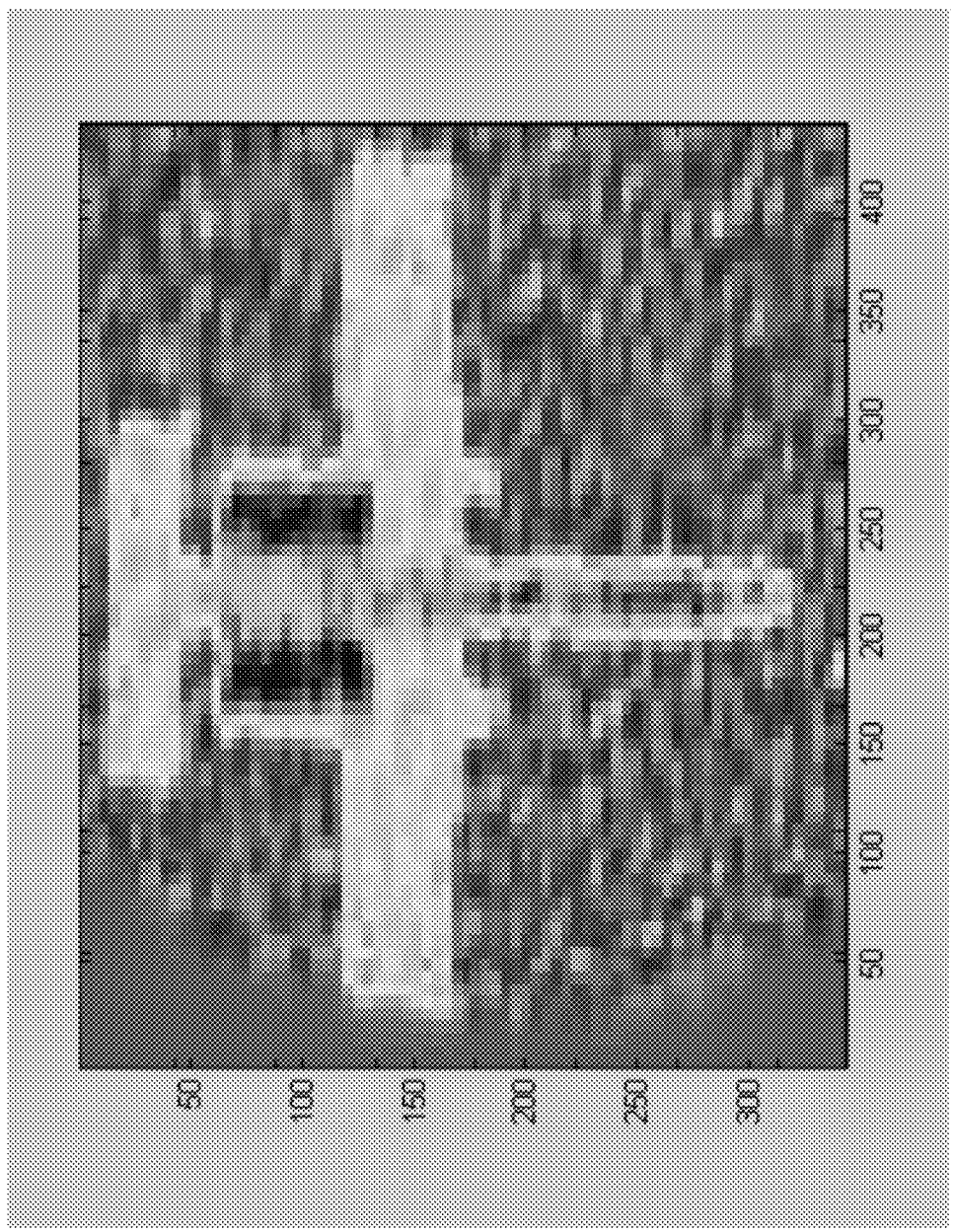
FIG. 29 is an illustration of an image constructed using a simulation showing a rendition of a plane integrated through a distance 19.

As mentioned previously, the present invention may be utilized in connection with small UAVs or the like. An example of a small sized ladar system is described in Stann, et al., "MEMS-scanned Ladar Sensor for Small Ground Robots," Proc. Of SPIE Vol. 76841E-1 (2010), wherein a ladar was mounted on an iRobot PackBot. FIG. 9 is a schematic illustration of a ladar system 30 comprising a laser 11S. The laser beam illuminates a MEMS mirror which is controlled by an HV Amplifier 32. The ladar utilizes a pulsed laser as a means to determine range to a pixel and a two-axis MEMS mirror to establish the angular direction to a pixel. Referring to the block diagram of FIG. 9, a trigger signal commands an Erbium fiber laser 11S to emit a short 2-3 ns pulse of light at a rate of 200 kHz that is collimated and then directed to the surface of a small MEMS mirror 31. Analog voltages from a high voltage amplifier 32 set the pointing direction of the mirror. Light reflected from the mirror is then fed into a telescope that "amplifies" the scan angle of the MEMS mirror 31. Light backscattered from the target is collected by a detector (described above). Photocurrent from the detector is fed into a monolithic 50 ohm microwave amplifier 41 whose output is then split into low and high gain channels and fed into the rf interface board 34. Here the low and high gain channels may be adjusted in gain and hard limited to protect the analog-to-digital convertors (ADC) 35. The ADCs 35 may sample at a 1.5 giga-samples-per-second (GSPS) rate. A first-in first-out register (FIFO) on a field programmable gate array (FPGA) 36 is commanded by the FPGA software to start acquiring ADC data upon transmission of the laser pulse. The FPGA stores the amplitude data as a function of time from the ADC, determines the range to the pixel, and formats the data for acquisition by a PC for display. The FPGA 36 also controls the pointing direction of the MEMS mirror and directs the laser to emit a pulse. FIG. 10 is an illustration of a portion of the system of FIG. 9.

An example of a LADAR measurement setup is discussed more entensively in the reference of W. Ruff, K. Aliberti, J. Dammann, M. Giza, P. Shen, B. Stann, entitled "Performance of an FM/cw prototype ladar using a 32-element linear self-mixing detector array", Proc. SPIE, vol. 5086, pp 58-69, 2003, hereby incorporated by reference. Analog to digital (A/D) converters may be used to sample the voltage from each detector and transfer the voltage data into computer memory.

FIGS. 11-29 are illustrations of the results of a simulation of the lidar of a preferred embodiment. The Ghost Ladar simulations used an electronic model of an Army A-10 Aircraft. The illuminations used were actual measured speckle patterns and the distances are from bucket detectors looking down onto the top of the A-10. The distances were divided into 50 equal size ranges for the simulation. At each range a distance integrated "bucket" value was computed using the "speckle" patterns. A Ghost Image at each of the 50 ranges was computed using the same compressive technique described in ARL-TR-5095, "Diffraction Free Light Source for Ghost Imaging of Objects Viewed Through Obscuring Media. The Ghost Images using those "buckets" are shown in the color images on slides shown in FIGS. 11-29 and labeled Distance 1 to Distance 17. Distance 1 is the "nearest" to the "bucket" detectors, Distance 17 is the furthest and closest to the ground.

Slide 6 shows some tests of time (distance) resolution on an optical table using a pulsed laser, 2 photo-detectors, and a smart oscilloscope.

Since photon intensity variation is used in thermal ghost imaging, one risk factor is in replacing the Gaussian light source used in the interaction with the ground glass that produces the thermal light inhomogeneities, such as element 17T in FIG. 3. The light source used may be a nearly diffraction free source rather than a Gaussian light source. The approach was to find diffraction free patterns that will propagate down beam with the self mending property. The problem is mitigated in several ways. One technique is to bundle a number of fibers in parallel that each launch self-mending solitions of light that substitute for speckles. Another technique is to use a fiber positioner on the diffraction free light source fiber and have it undergo a high speed random displacement and launch the light solitons in random transverse positions. Our solution to producing the variation of the signal source was to randomly displace the center of the Bessel beam projected through a spatial light modulator (SLM). A Bessel beam is nearly diffraction free and has a self-mending property upon interaction with particulate disturbances. The Bessel beam approach is depicted in, inter alia, FIG. 6.*roved* to be successful. FIG. 6 is a shematic layout of the Bessel beam illumination ghost imaging experiments. Quantum Ghost Imaging (QGI) may use a plurality of sensors. The first sensor (CCD 19) is a camera that looks at the reference beam of the light source. Second sensors (14, 15) may be single-pixel photon bucket detector that collects photons from a separate test beam path that are scattered and reflected from the object to be imaged. The quantum ghost image is constructed from the Glauber G(2) coherence using the coincidence measurements of photons. QGI is quantum, since it can use entangled photons or thermal photons that have a nonlocal, nonfactorizable property. The term QIGI may be used since only a photon bucket detector is used. The G(2) is computed using projected patterns of light for the reference beam and not the measured patterns of light. As the illuminating Bessel beam pattern (insert A in FIG. 6) is transmitted, each illumination pattern of the SLM was saved in computer memory so the QIGI could be computationally reconstructed using the additional photon bucket detector values. Detectors 14, 15 may comprise a single-pixel distant photon bucket detector as the only sensors. A diffraction free laser light source may be used in place of the usual transverse Gaussian or spatially random intensity beam. Diffraction free light beams penetrate though obscuring media far better than Gaussian beams. The diffraction free light beams have a self mending property in that when they encounter a small absorber their shape is temporarily distorted, but as they pass around the absorber they re-form into a self-similar shape. There is some loss of energy, but the concentrated light beam shape is maintained. This is a near ideal property for putting energy on target in the presence of the small and large particulates that occur in military smokes and fog. The diffraction free source can be fabricated from axicon lenses, special fiber optics, diffraction gratings, or an SLM (17T, 17A, 17R) and a laser 11.

Figure 30:
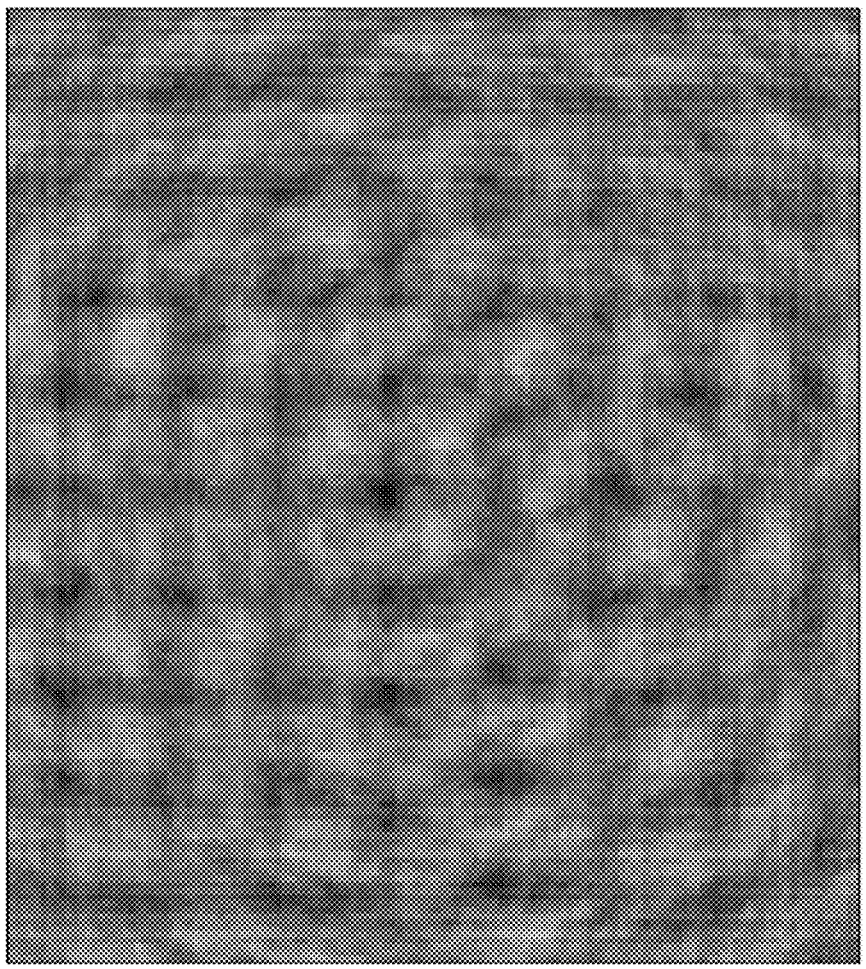
FIG. 30 is an illustration of an example of the sum of Bessel illumination patterns cropped to an area of interest.

The schematic layout for the basic experiments using Bessel beams is shown in FIG. 6. A laser beam was expanded and transmitted through an SLM 17A to impress on the laser beam profile the phase for a Bessel beam. Single-pixel photon bucket detectors 14, 15 were used to collect photons scattered and reflected from the object. This beam was then propagated to a target, in this case, the letters "ARL" as represented by target 13 in FIG. 6. For example, the ARL may be a 10-point font size. To achieve reasonable illumination coverage over the ensemble of measurements of the target area, the Bessel beam patterns were randomly translated in x and y on the SLM. The sum, or equivalently the average, of all the Bessel beams used for illumination were computed and are displayed in FIG. 30. The patterns were not quite uniform; rather they exhibited some structured variation, although most of the space was filled.

Figure 31:
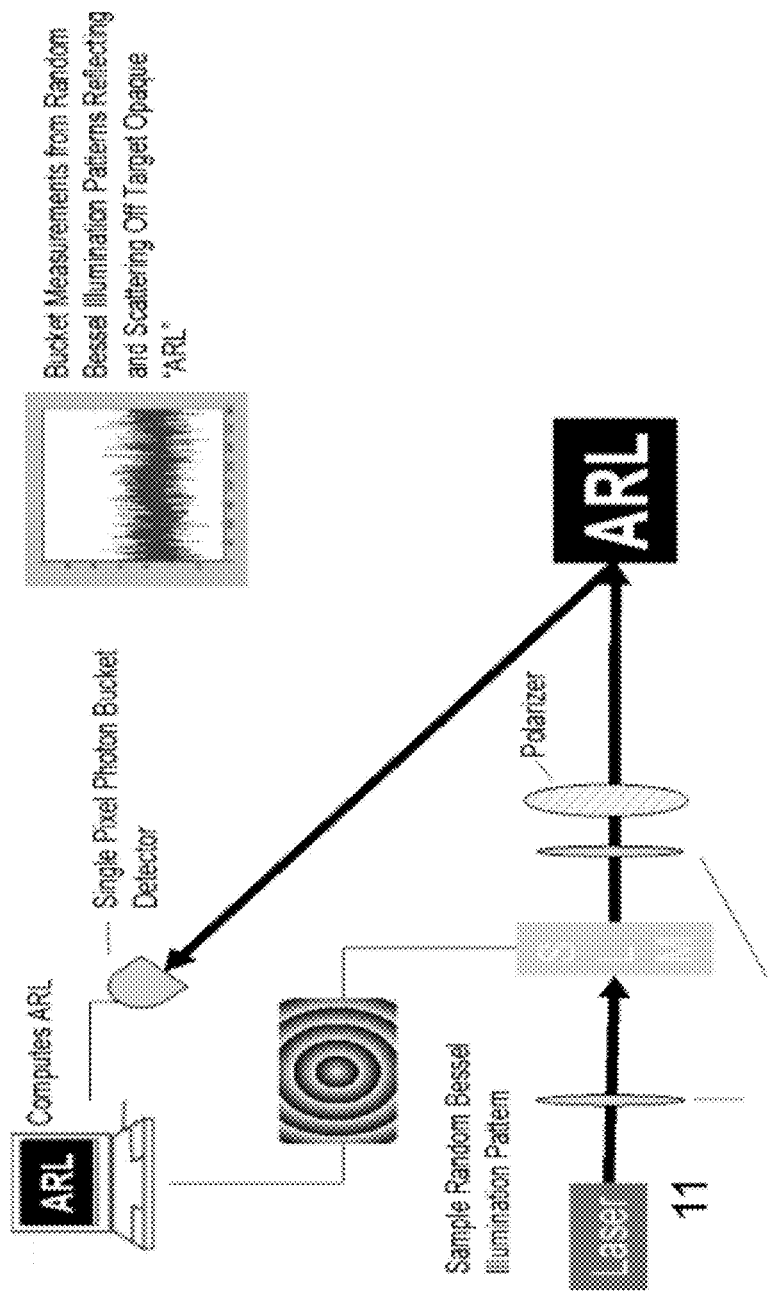
FIG. 31 is an illustration of a schematic layout of a Bessel beam illumination ghost imaging experiment.
Figure 32:
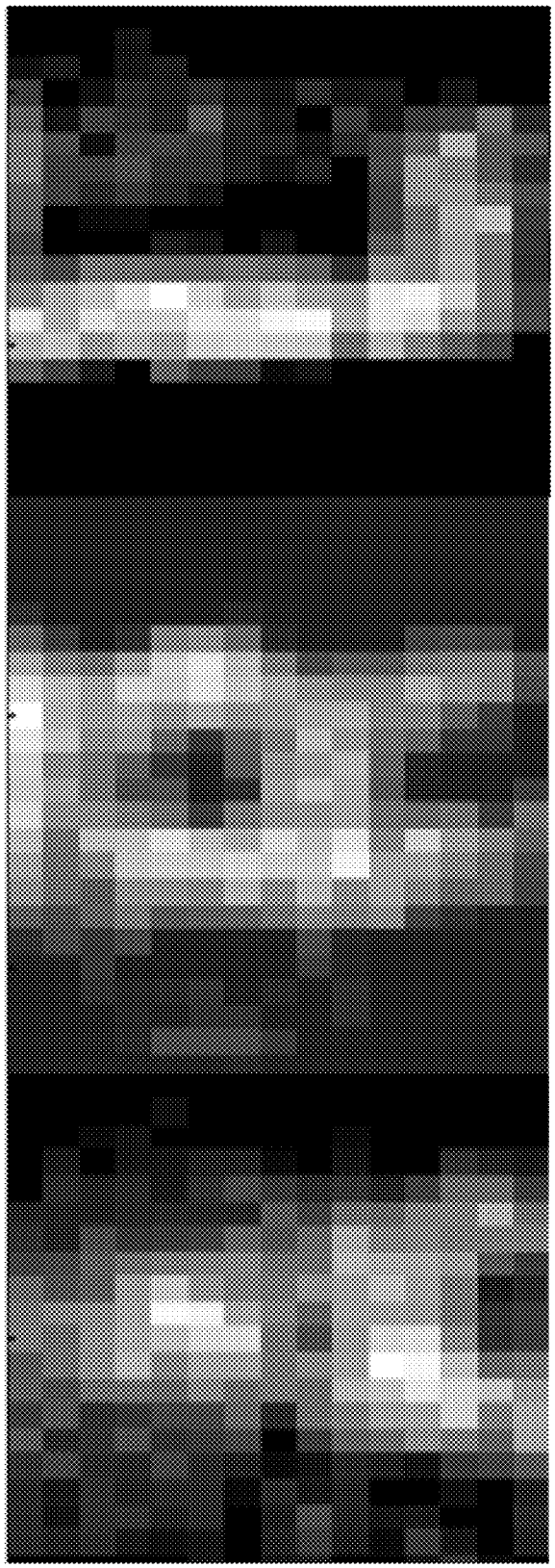
FIG. 32 is an illustration of a computed "ARL" ghost image using random Bessel beam illumination without obscuration.
Figure 33:
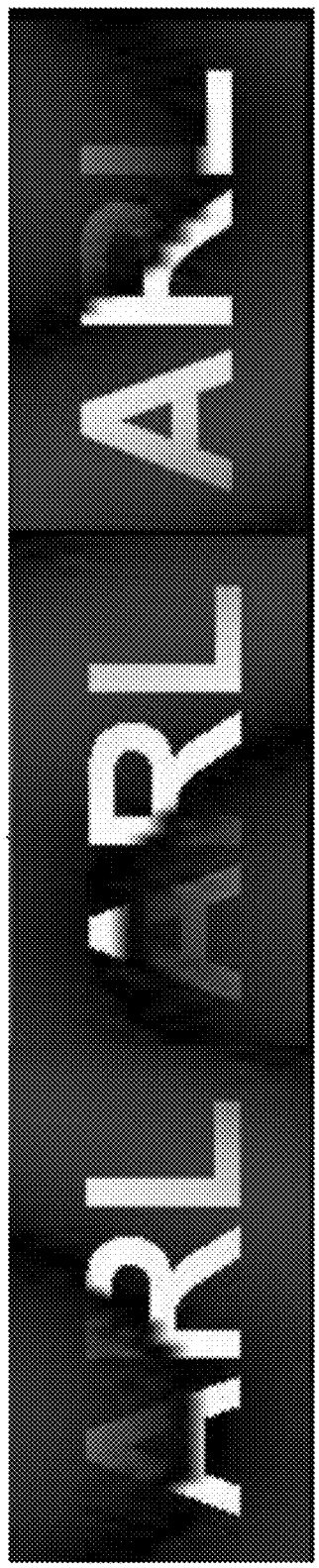
FIG. 33 is an illustrative image of the coarse Bessel pattern illuminating the ARL target.
Figure 34:
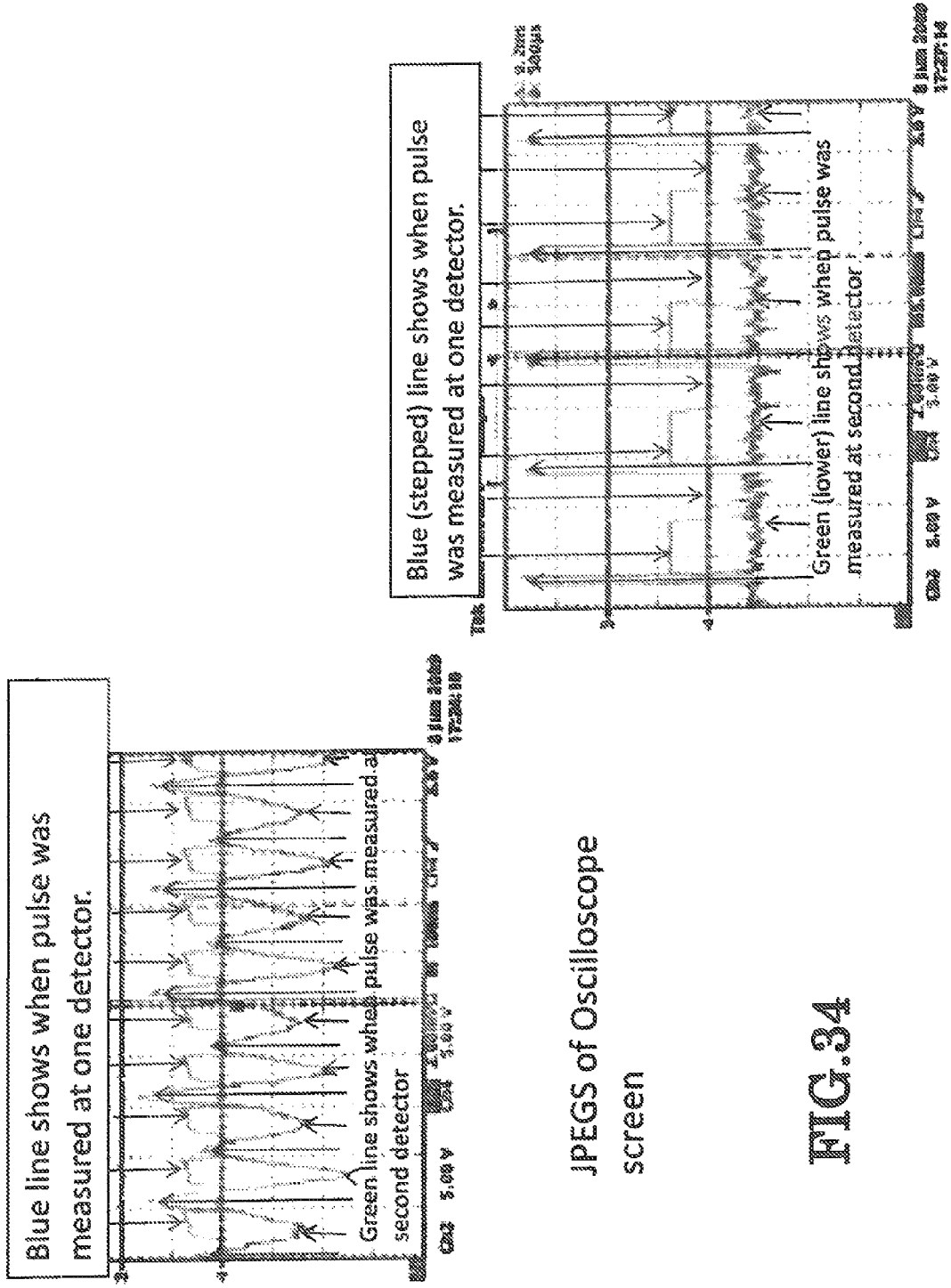
FIG. 34 is an illustration showing JPEG images from an oscilloscope screen showing when pulse was measured at one detector using a blue line and when pulse was measured at a second detector using a green line.

Bessel patterns were randomly translated in x and y across the field of view by modulating the SLM for different illumination patterns on the target (FIG. 33). FIG. 33 is an illustrative image of the coarse Bessel pattern illuminating the ARL target. A single-pixel, photon-counting bucket detector collected and measured the light reflected from the "ARL" target (FIG.4 and 31). These "bucket" measurements were then combined with the known Bessel illumination patterns (see insert A, FIG. 6) to generate an image of the object (FIG. 31). Fine-scale illumination patterns can be resolved with high resolution fine images. Coarse Bessel patterns were used in an attempt to see if they could resolve fine lettering, where the distance between maxima in the illuminating beam was greater than the size of the letter dimensions. This first set of experiments was performed without obscuration to align and test the optics and SLM properties. Test images (FIG. 31) revealed that coarse Bessel beams could resolve the fine letters.

Obscured Experiments

The light beam 12 was passed through an offset pinhole (less than 2 mm in diameter) placed between an "ARL" target and the Bessel beam source. The target "ARL" was not in the direct line of sight from the laser to pin hole. The experiments were performed again using the randomly translated Bessel patterns similar the one used in FIG. 33. As was anticipated from the self-mending property of the Bessel beams, one was able to generate a ghost image under such an adverse condition that was only slightly degraded from the unobscured ghost image in FIG. 31.

Quantum Inspired Ghost Imaging

Figure 35:
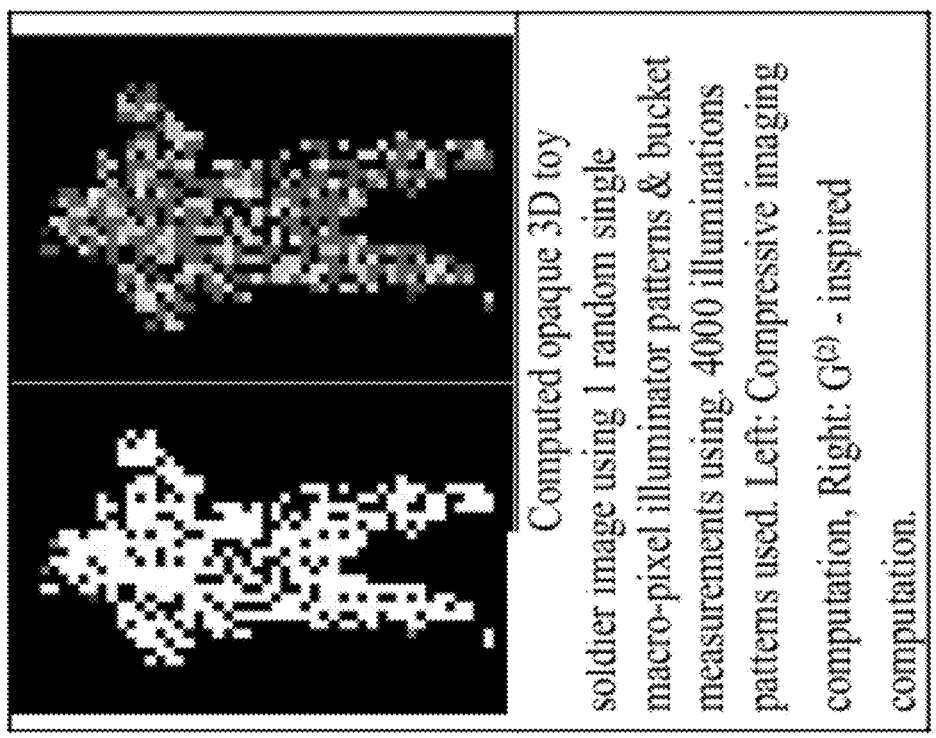
FIG. 35 illustrates QIGI results using a 1 macro pixel illuminator.

The SLM was used to project random illumination patterns onto a model soldier to generate ghost images of a threedimensional (3-D) opaque object. Varying numbers of "on" illuminating pixels of the SLM were used in these experiments. The term "on" pixels means "macro-pixel illuminators" or "macro pixels." The positions of the "on" macro pixels were randomly distributed in space from measurement to measurement. QIGI results using a 1 macro pixel illuminator are presented in FIG. 35 and similar results using 3 macro pixel illuminators are presented in FIG. 36. Computed opaque 3-D toy soldier image using 1 random single macro-pixel illuminator patterns and bucket measurements using 4000 illuminations patterns: (left) compressive imaging computation and (right) $G^{(2)}$, the inspired computation. FIG. 36 is a computed opaque 3-D toy soldier image using 3 random single macro-pixel illuminator patterns and bucket measurements using 4000 illuminations patterns: (left) compressive imaging computation and (right) $G^{(2)}$, the inspired computation. It should be noted that increasing the number of "on" pixels from 1 to 3 per measurement appeared to decrease the contrast of the generated ghost images, though the resolution may be greater.

As used in the specification and following claims, the term "processor" means one or more processing units, central processing unit(s), CPU, processor cores, microprocessors, digital signal processors, multiprocessor(s), computer(s), and/or controller(s) which may be connected together or to other circuitry in a manner known to those of ordinary skill in the art.

As used in the specification and claims, the term "subject" means stationary or moving target, object, person or persons, scene, vehicle or vehicles and includes object(s), area, person (s), setting, place, mask, or scene.

The terminology "nonspatial information" as used herein means information which is one dimensional (1-D) such as that recorded by a bucket detector.

The terminology "bucket detector" means a detector which detects photons of light without imaging capability or two-dimensional information.

The terminology "ghost imaging" or "quantum ghost imaging" (QGI) as used herein have the same meaning except when specifically indicated to the contrary. "Ghost imaging" or "quantum ghost imaging" includes imaging emerging from the correlation between the output of a bucket detector (or a plurality of bucket detectors) that collects light that interacted with an object with the output from a second, scanning point detector or a CCD array that is illuminated by the same source. The imaging system does not require that the bucket detector have imaging capability.

The terminology "computational ghost imaging" or "quantum ghost imaging" or "ghost imaging" as used herein have the same meaning except when specifically indicated to the contrary and relate to imaging emerging from the correlation between the output of a bucket detector (or detectors) and computational outputs which compute the spatial information concerning the light beam. The computational outputs determine the spatial information and replace the second detector. "Computational ghost imaging" or "quantum ghost imaging" or "ghost imaging" may use an incoherent sources of light.

The terminology "pseudothermal ghost imaging (PGI)" or "quantum ghost imaging" or "ghost imaging" as used herein have the same meaning except when speicifically indicated to the contrary. "Pseudothermal ghost imaging (PGI)" or "quantum ghost imaging" or "ghost imaging" may use a single random source and, by correlating the output of at least one bucket detector with at least one spatial detector, obtain an image of an object.

The terminology "spatial light modulator ghost imaging" or "ghost imaging" or "quantum ghost imaging" (QGI) as used herein have the same meaning except when specifically indicated to the contrary, and comprises using a spatial light modulator to modulate the light transmitted to the target or subject area. The spatially modulated light may also be directed to a second CCD detector or the like to record the spatially modulated light.

The terminology "Gaussian state" as include laser light, LED light, sunlight, "classical states," low-flux biphoton output from SPDC.

The terminology "incoherent light" as used herein means electromagnetic radiant energy not all of the same phase, with or without various wavelengths.

The terminology " thermal light" or "thermal radiation" as used herein means electromagnetic radiation emitted from a material which is due to the heat of the material, the characteristics of which depend on its temperature; for example infrared radiation emitted by a common radiator or electric heater.

The terminology "beam splitter" as used herein means an optical device that splits a beam of light in two. The terminology beam splitter includes a cube made from two triangular glass prisms which are glued together at their base using resin. The thickness of the resin layer may be adjusted such that (for a certain wavelength) half of the light incident through one "port" (i.e., face of the cube) is reflected and the other half is transmitted due to frustrated total internal reflection. The terminology beam splitter includes polarizing beam splitters, such as the Wollaston prism, which use birefringent materials, splitting light into beams of differing polarization. The terminology "beam splitter further includes a half-silvered mirror (or pellicle) comprising for example a plate of glass with a thin coating of aluminium where approximately half of light incident at a 45 degree angle is transmitted, and the remainder reflected. A dielectric optical coating may be substituted for the metallic coating.

The terminology "phase detector" as used herein comprises a frequency mixer or analog multiplier circuit that generates a voltage signal which represents the difference in phase between two signal inputs. The terminology phase detector includes an electronic phase detector; the output of the detector represents the phase difference between the signals.

The terminology "correlation detector" as used herein includes coincidence detection and includes a method of signal detection in which a return or response signal is compared with a reference signal. The terminology "correlation detector" includes cross-correlation detection.

The foregoing description is illustrative of particular embodiments of the invention, but is not meant to be a limitation upon the practice thereof The following claims, including all equivalents thereof, are intended to define the scope of the invention.

The invention claimed is:

1. A system for imaging information comprising;
a processor for processing information;
at least one photon light source;
a beam splitter for splitting the at least one light source into first and second beams, the first beam being directed to a first location and the second beam being directed to a second location;
a spatial receiver at the second location for receiving said second beam and for detecting spatial information concerning said second beam; the spatial receiver being operatively connected to the processor and operating to transmit spatial information correlated to specific intervals of time to the processor;
at least one first receiver operative to detect the influence of a subject on the first beam;

the at least one first receiver being operatively connected to the processor and operating to transmit nonspatial information to the processor;

the processor operating to correlate a response by the at least one receiver with spatial information derived from the spatial receiver at a correlating interval of time to create an image of the subject.

2. The system of claim 1 wherein the at least one first receiver comprise a plurality of first receivers; each of the plurality of receivers operating to detect photons influenced by the subject.

3. The system of claim 2 wherein the plurality of first receivers are spaced different distances from the subject, whereby comparison of each of the outputs of the plurality of first receivers provides three dimensional information concerning the subject.

4. The system of claim 1 further comprising a timer measuring the time that the at least one first receiver receives light from the subject.

5. The system of claim 1 wherein the at least one first receiver receives light reflected from the subject.

6. The system of claim 1 wherein the at least one photon source comprises modulated light.

7. The system of claim 1 wherein the modulated light is modulated by a thermalizing element.

8. A method for imaging comprising:
generating a beam of photons, at least a portion of the beam of photons being at a first location;
detecting light influenced by an object or objects in the first location using a plurality of first detectors; the plurality of first detectors being spaced at known, different distances from the object,
determining the presence of an object based upon the outputs of the plurality of first detectors;
correlating the outputs of the first detectors and using phase detection, producing a three dimensional image of the object.

9. The method of claim 8 further comprising splitting the beam of photons into first and second parts of the beam; the first part being directed in a first direction towards a first location such that at least a portion of the first part is influenced by an object present at the first location and detected by at least one first detector, the second part of the beam being directed in a second direction absent the subject and detected by a second detector.

10. The method of claim 8, further comprising passing the generated beam of photons through a thermalized light source.

11. The method of claim 8, further comprising passing the generated beam of photons through a spatial light modulator.

12. The method of claim 8 wherein the at least two first detectors are operatively connected to at least one correlation and phase difference calculator which produces a three dimensional image of the object.

13. The method of claim 9 wherein the at least one first detector and second detector are operatively connected to a processor.

14. The method of claim 8 further comprising modulating the generated beam of photons using a modulator, the modulator being operatively connected to a processor which monitors or records the modulation of the beam of photons, whereupon the processor determines three dimensional information based upon the output of the modulator and the outputs of the first detectors.

15. A system for imaging comprising:
a processor for processing information;
at least one photon light source generating a beam of light;
a modulator for modulating the light of the at least one photon light source;
a plurality of first receivers operative to detect the influence of a subject on the beam; the plurality of first receivers being operatively connected to the processor and operating to transmit nonspatial information to the processor; the plurality of first receivers being spaced at known, different distances from the subject, whereby comparison of each of the outputs of the plurality of first receivers provides three dimensional information concerning the subject;
the processor operating to correlate the outputs of the plurality of first receivers with spatial information derived from the modulated light at correlating intervals of time to create a three dimensional image of the subject.

16. The system of claim 15 further comprising a correlation and phase difference calculator which determines three-dimensional information from the outputs of the plurality of first receivers.

17. The system of claim 15 further comprising a timer measuring the time that each of the first receivers receives light from the subject.

18. The system of claim 15 wherein the modulator comprises a spatial light modulator.

19. The system of claim 18 wherein the range is determined by computationally projecting the light patterns of the spatial light modulator to many different distances using only those projected patterns that generate a ghost image to determine distance of the subject to create a three-dimensional image.

20. The system of claim 15 further comprising at least one second detector which records the modulation of the beam of light; the at least one second detector operating to detect spatial information concerning the modulated beam of light; the plurality of first detectors operating independently of spatial information.

* * * * *